US006143183A

United States Patent [19]

Wardwell et al.

[11] Patent Number: 6,143,183

[45] **Date of Patent: *Nov. 7, 2000**

[54] METHOD AND APPARATUS FOR CONTROLLING AND MONITORING CONTINUOUS FEED CENTRIFUGE

[75] Inventors: Peter Wardwell, Medfield; Wallace Leung, Sherborn, both of Mass.

[73] Assignee: Baker Hughes Incorporated, Houston, Tex.

[ * ] Notice: This patent is subject to a terminal disclaimer.

[21] Appl. No.: 09/340,488

[22] Filed: Jun. 30, 1999

Related U.S. Application Data

[63] Continuation of application No. 08/756,713, Nov. 26, 1996, Pat. No. 5,948,271

[60] Provisional application No. 60/007,880, Dec. 1, 1995.

[51] Int. Cl.[7] ......................... B01D 17/12; B01D 17/038; B04B 13/00

[52] U.S. Cl. ............................. 210/739; 210/85; 210/86; 210/87; 210/90; 210/94; 210/96.1; 210/143; 210/512.1; 210/745; 210/746; 210/781; 494/1; 494/10; 494/50

[58] Field of Search ................................. 210/85–87, 90, 210/91, 94, 96.1, 109, 110, 143–145, 360.1, 374, 378, 379, 512.1, 739, 745, 781, 787, 746; 494/1, 7, 8, 10, 37, 50–54, 84; 364/528.08

[56] References Cited

U.S. PATENT DOCUMENTS

| | | |
|---|---|---|
| 3,070,291 | 12/1962 | Bergey . |
| 3,307,164 | 2/1967 | Zimmer . |
| 3,407,999 | 10/1968 | Kirkpatrick . |
| 3,532,264 | 10/1970 | Amero . |
| 3,595,470 | 7/1971 | Shapiro . |
| 3,623,657 | 11/1971 | Trump . |
| 3,701,469 | 10/1972 | Nilsson . |
| 3,851,819 | 12/1974 | Tadokoro . |
| 3,982,162 | 9/1976 | Olliffe . |
| 3,986,663 | 10/1976 | Jonsson et al. . |
| 4,014,498 | 3/1977 | Broadwell et al. . |
| 4,070,290 | 1/1978 | Crosby . |
| 4,223,829 | 9/1980 | Bange . |
| 4,228,949 | 10/1980 | Jackson . |
| 4,240,578 | 12/1980 | Jackson . |
| 4,244,513 | 1/1981 | Fayer et al. . |
| 4,285,810 | 8/1981 | Kirkland et al. . |

(List continued on next page.)

FOREIGN PATENT DOCUMENTS

| | | |
|---|---|---|
| 0 196 638 | 10/1986 | European Pat. Off. . |
| 0 490 270 A2 | 6/1992 | European Pat. Off. . |
| 1431973 | 1/1966 | France . |
| 1 951 574 | 4/1970 | Germany . |
| 3921327 A1 | 1/1991 | Germany . |
| 41 04 483 A1 | 8/1992 | Germany . |
| 58-205554 | 11/1983 | Japan . |
| 62-168560 | 7/1987 | Japan . |
| 02071859 | 3/1990 | Japan . |
| 020718590 | 12/1990 | Japan . |
| 406099102 | 4/1994 | Japan . |
| 406099103 | 4/1994 | Japan . |
| 406099104 | 4/1994 | Japan . |
| 2 240 496 | 8/1991 | United Kingdom . |
| WO 95/26223 | 10/1995 | WIPO . |

OTHER PUBLICATIONS

SBC.SEF Feb. 26, 1993; Sharples Electrical Flash, 3 pages.

*Primary Examiner*—Joseph W. Drodge
*Attorney, Agent, or Firm*—Cantor Colburn LLP

[57] ABSTRACT

Computerized (e.g., "intelligent") systems for monitoring, diagnosing, operating and controlling various parameters and processes of continuous feed centrifuges is presented. The computer control system actuates at least one of a plurality of control devices based on input from one or more monitoring sensors so as to provide real time continuous operational control. The monitoring sensors may sense process and other parameters located both inside the centrifuge (e.g., inside the bowl) and outside or exterior to the centrifuge (e.g., outside the bowl) including machine operation parameters and parameters related to the input and output streams of the centrifuge.

32 Claims, 30 Drawing Sheets

U.S. PATENT DOCUMENTS 4,287,758 9/1981 Swearingen .
4,298,162 11/1981 Hohne .
4,303,192 12/1981 Katsume .
4,369,915 1/1983 Oberg et al. .
4,421,502 12/1983 Jakobs .
4,432,747 2/1984 Posse et al. .
4,522,620 6/1985 Leister .
4,525,155 6/1985 Nilsson .
4,551,715 11/1985 Durbin .
4,567,373 1/1986 O'Meara et al. .
4,586,375 5/1986 Manfredi .
4,622,029 11/1986 Nilsson .
4,662,866 5/1987 Ehnstrom .
4,668,213 5/1987 Kramer .
4,746,210 5/1988 DiFoggio et al. .
4,759,744 7/1988 Krook .
4,768,389 9/1988 Chszaniecki .
4,782,696 11/1988 Suchoza .
4,827,197 5/1989 Giebeler .
4,952,127 8/1990 Schmeisser et al. .
4,957,475 9/1990 Kreill .
4,983,289 1/1991 Salomon .
5,037,371 8/1991 Romanauskas .
5,147,277 9/1992 Shapiro .
5,156,751 10/1992 Miller .
5,203,762 4/1993 Cooperstein .
5,217,428 6/1993 Schlip et al. .
5,235,864 8/1993 Rosselli et al. .
5,244,451 9/1993 Retter .
5,253,529 10/1993 Lenormand et al. .
5,257,968 11/1993 Caldwell .
5,287,265 2/1994 Hall et al. .
5,342,280 8/1994 Niinai et al. .
5,370,599 12/1994 Marque et al. .
5,455,516 10/1995 Jean et al. .
5,484,521 1/1996 Kramer .
5,525,240 6/1996 Lemelson ................................ 210/739
5,529,566 6/1996 Weil .
5,618,409 4/1997 Kreill ................................... 210/360.1
5,643,169 7/1997 Leung et al. .............................. 494/53
5,736,054 4/1998 Feller et al. .
5,752,910 5/1998 Cheng .
5,948,271 9/1999 Wardwell et al. ...................... 210/739

INPUTS

I. INFORMATION ORIGINALLY STORED IN MEMORY
OPERATIONS MAINTENANCE INFORMATION TRAINING INFORMATION

II. INFORMATION PROGRAMMED AT SITE
OPERATING RANGES
OUTPUT PARAMETERS DESIRED
SITE SPECIFIC DATA (E.G., ENVIRONMENTAL)

III. OPERATING PARAMETERS SENSED
VIBRATION MAGNITUDE AND FREQUENCY AT GEAR BOX AND BEARINGS
TORQUE (AC AND DC)
SPEED OF ROTATION OF BOWL AND CONVEYOR/DIFFERENTIAL SPEED

IV. INPUT AND OUTPUT STREAM PARAMETERS SENSED
SOLIDS CONCENTRATION
PURITY OF RECOVERY
MASS FLOW RATE
TEMPERATURE
CONSTITUENT ANALYSIS (E.G., SPECIFIC GRAVITY)
POLYMER ADDITION
PARTICLE SIZE DISTRIBUTION
MOISTURE OF CAKE/DENSITY OF CAKE
VOLUMETRIC FLOW RATE

V. INTERNAL CENTRIFUGE PARAMETERS SENSED
CAKE HEIGHT
INTERFACE HEIGHT (E.G., OIL/WATER OR EMULSION)
POOL HEIGHT
PRESSURE
GAPS - FILTER CAKE BAFFLE POSITION
-CLEARANCE BETWEEN BOWL/AND CONVEYOR
-WEIR OVERFLOW
TEMPERATURE
POSITION OF INTERNAL MEMBERS (E.G., FEED INLET AND SCROLL)
CAKE SURFACE VELOCITY
ACTUAL INTERNAL SEPARATION (E.G. AS SHOWN BY CAMERA)
SOLIDS CONCENTRATION OF CAKE AND/OR POOL
PARTICLE SIZE DISTRIBUTION

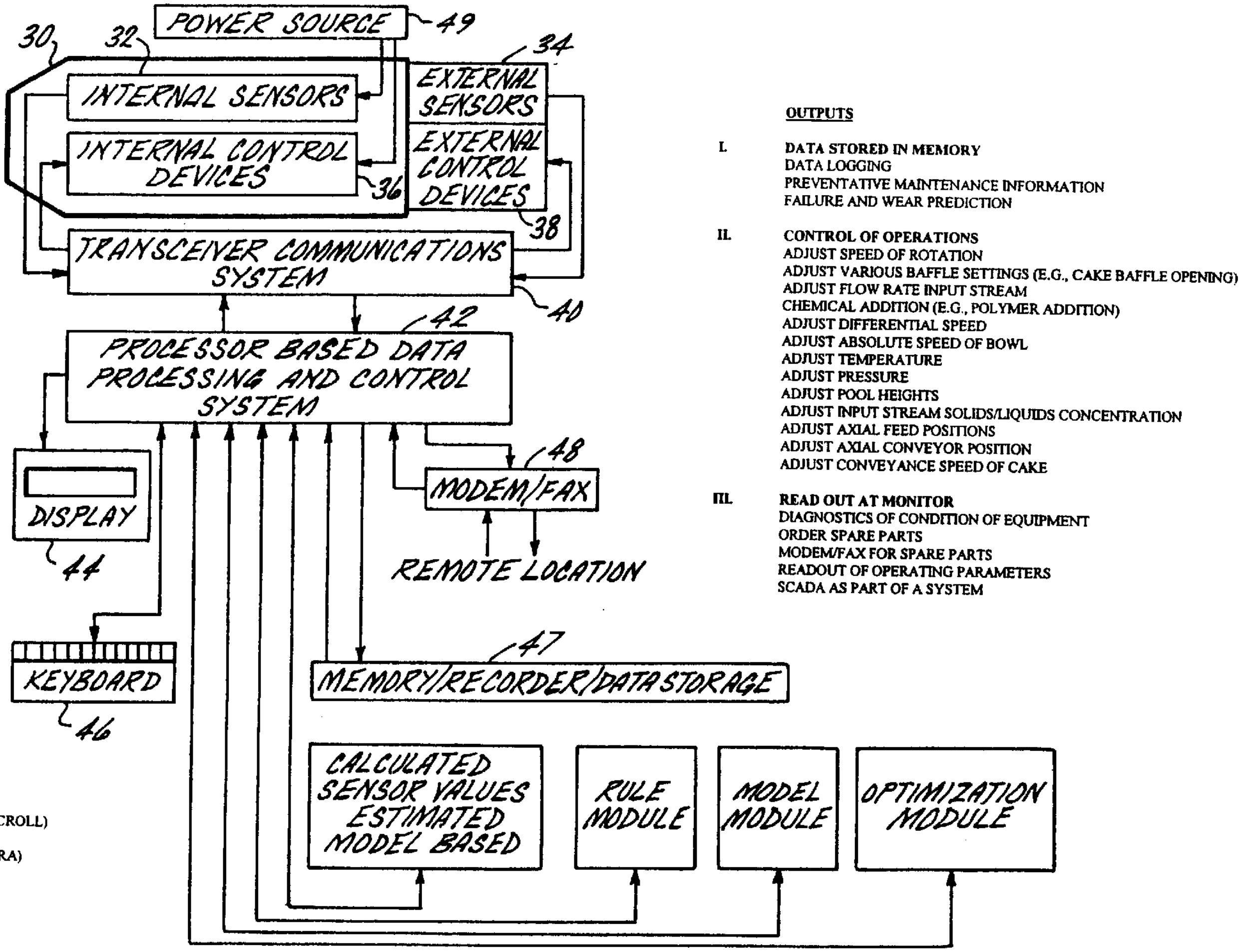

FIG. 2

OUTPUTS

I. DATA STORED IN MEMORY
DATA LOGGING
PREVENTATIVE MAINTENANCE INFORMATION
FAILURE AND WEAR PREDICTION

II. CONTROL OF OPERATIONS
ADJUST SPEED OF ROTATION
ADJUST VARIOUS BAFFLE SETTINGS (E.G., CAKE BAFFLE OPENING)
ADJUST FLOW RATE INPUT STREAM
CHEMICAL ADDITION (E.G., POLYMER ADDITION)
ADJUST DIFFERENTIAL SPEED
ADJUST ABSOLUTE SPEED OF BOWL
ADJUST TEMPERATURE
ADJUST PRESSURE
ADJUST POOL HEIGHTS
ADJUST INPUT STREAM SOLIDS/LIQUIDS CONCENTRATION
ADJUST AXIAL FEED POSITIONS
ADJUST AXIAL CONVEYOR POSITION
ADJUST CONVEYANCE SPEED OF CAKE

III. READ OUT AT MONITOR
DIAGNOSTICS OF CONDITION OF EQUIPMENT
ORDER SPARE PARTS
MODEM/FAX FOR SPARE PARTS
READOUT OF OPERATING PARAMETERS
SCADA AS PART OF A SYSTEM

METHOD AND APPARATUS FOR CONTROLLING AND MONITORING CONTINUOUS FEED CENTRIFUGE

CROSS REFERENCE TO RELATED APPLICATION

This application claims the benefit of U.S. Provisional Application Ser. No. 60/007,880 filed Dec. 1, 1995 and is a continuation of application Ser. No. 08/756,713 filed Nov. 26, 1996, now U.S. Pat. No. 5,948,271.

FIELD OF THE INVENTION

This invention relates generally to continuous feed centrifuges. More particularly, this invention relates to methods and apparatus for automatically monitoring, operating and controlling continuous feed centrifuges using computer control systems and remote sensing devices. This invention is particularly useful in the control and operation of decanter centrifuges such as solid bowl and screen bowl centrifuges, but also finds utility in other continuous feed centrifuges such as pusher and scroll/screen centrifuges.

BACKGROUND OF THE INVENTION

Continuous feed centrifuges are used in many industrial applications for separation of solids and liquids. In general, such continuous feed centrifuges include an outer rotating member in the form of a solid or perforate bowl. Examples of continuous feed centrifuges are disclosed in commonly assigned U.S. Pat. Nos. 4,381,849; 4,464,162; 5,147,277 and 5,378,364. As used herein, continuous feed centrifuges include sedimenting solid bowl and filtering pusher and scroll/screen as well as hybrid sedimenting and filtering screen bowl centrifuges. For ease of illustration, the present invention will be primarily described from the standpoint of a solid bowl centrifuge and therefore the components and operation of prior art solid bowl centrifuges will now be described in some detail.

A solid bowl or decanter centrifuge generally includes an outer bowl, an inner hub carrying a scroll conveyor, a feed compartment within the conveyor wherein the feed slurry is accelerated to speed before being introduced into the separation pool, and discharge ports for cake solids and clarified liquid or centrate. It will be appreciated that the cake solids will be interchangeably referred to herein as solid, heavy phase or higher density discharge or output stream. Similarly, the clarified liquid or centrate will be interchangeably referred to herein as liquid, light phase or lower density discharge or output stream. The bowl includes a cylindrical section and a conical beach section. The bowl and the hub are rotated at high, angular speeds so that heavier solid particles of a slurry, after accelerated to speed and introduced into the bowl, are forced by centrifugation into an annular layer along the inside bowl surface thereof. By differential rotation of the scroll conveyor and the bowl, the sediment is conveyed or scrolled to a cake discharge opening at the smaller, conical end of the bowl. Additional discharge openings are provided in the bowl, usually at an end opposite of the conical section for discharging a liquid phase or liquid phases separated from the solid particles in the centrifuge apparatus.

Controlling and optimizing the operation of such centrifuges is a difficult task considering the high rotational speeds of the bowl and hub, and the continuously changing characteristics of the input or feed stream (slurry) and the light phase and heavy phase output streams. Notwithstanding these difficulties, there have been some attempts in the prior art to provide control systems for bowl/conveyor type (decanter) centrifuges. For the most part, all of these control systems utilize torque measurement (e.g., dc or steady torque measurement) as an input for controlling the speed of the conveyor and/or bowl. Examples include U.S. Pat. Nos. 4,369,915; 4,432,747 and 4,668,213. All of these patents disclose a torque measuring device for measuring the torque input to the screw conveyor and based on this torque measurement, the differential speed between the bowl and conveyor is optimized. In U.S. Pat. No. 5,156,751 to Miller, a similar type of centrifuge is shown wherein sensing and control means 33 regulates the speed of the conveyor 22, the control means being responsive to a torque measurement.

U.S. Pat. No. 4,303,192 ('192) to Katsume discloses a centrifuge control system which controls and/or regulates the differential speed between the bowl and the conveyor and/or the solid matter quantity supplied to the centrifuge per unit of time in response to the sensing of certain operating parameters such as (1) the torque of the conveyor and/or (2) solid matter concentration in the solid matter discharge and/or (3) solid matter concentration in the liquid separation product discharge. The '192 patent discloses a measuring unit 43 for measurement of torque, a solid matter concentration measuring unit 40 for measurement of the centrifuge solids discharge and a solid matter concentration measuring unit 38 for measurement of solids concentration in the liquid discharge. Measuring unit 40 determines the quantity and/or the solid matter concentrations of the concentrated sludge being output and converts the resulting value into an electrical signal. Similarly, the solid matter concentration in the liquid separation product is determined by measuring unit 38, converted to an electrical signal and transmitted to computational unit 42, 48. As stated in column 6 of the '192 patent, lines 24–33, the control system has three input variables including (1) torque of the conveyor, (2) quantity and concentration of solid matter in the solids discharge and (3) quantity and concentration of solid matter in the liquid separation product. Based on this input, three controls of the centrifuge are initiated including (1) the speed of the bowl, (2) the differential speed of the bowl and conveyor and (3) the amount of solid matter/slurry quantity being supplied to the centrifuge.

Other decanter centrifuge patents describing control systems include U.S. Pat. Nos. 5,203,762 ('762) and 4,298,162 ('162). The '162 patent describes a control system for controlling the drive motors of the centrifuge using several ac/dc conversions for generating power from the backdrive motor and converting this power for use by the main drive motor. The '162 patent utilizes a gear which interconnects the screw conveyor to the bowl and two rotary, positive displacement machines for controlling relative rpm of the conveyor.

Unfortunately, none of the aforementioned prior art provides a comprehensive computerized (e.g., microprocessor) control system for operating, controlling and monitoring continuous feed centrifuges such as solid bowl, screen bowl, scroll/screen or pusher type centrifuges. However, the ability to provide precise, real time control and monitoring of such centrifuges constitutes an on-going, critical industrial need.

SUMMARY OF THE INVENTION

The above-discussed and other problems and deficiencies of the prior art are overcome or alleviated by the several methods and apparatus of the present invention for providing computerized (e.g., "intelligent") systems for operating, controlling, monitoring and diagnosing various parameters and processes of continuous feed centrifuges. An "Intelligent" centrifuge of the type disclosed herein has the capability of providing information about itself, predicting its own future state, adapting and changing over time as feed and machine conditions change, knowing about its own performance and changing its mode of operation to improve its performance.

In accordance with the present invention, a computer control system actuates at least one of a plurality of control devices based on input from one or more monitoring sensors so as to provide real time continuous operational control. The monitoring sensors may sense process and other parameters located both inside the centrifuge (e.g., inside the bowl) and outside or exterior to the centrifuge (e.g., outside the bowl) including machine operation parameters and parameters related to the input and output streams of the centrifuge. Examples of outside parameters related to the input and output streams which may be sensed include any one of volumetric flow rate (including flow rate of both effluent and feed), mass flow rate (effluent, cake and feed), moisture of cake (e.g., cake solids), particle size distribution of input and output streams, temperature of input and output streams, solids concentration of feed and effluent streams, constituent analysis (e.g., specific gravity) of streams and dosage rate of polymers and other additives.

Other exterior parameters which may be sensed include centrifuge operating parameters such as differential speed, bowl speed, vibration, acoustic emissions, torque (both ac and dc) and pressure.

Parameters internal to the centrifuge which may be sensed include, but are not limited to cake height, interface height, (e.g., oil/water interface or location and thickness of emulsion layer), pool height, pressure, gaps (such as cake baffle opening, clearance between bowl and conveyor and weir overflow), temperature, positioning of internal components (such as feed inlet and scroll), velocity of cake and effluent, particle size distribution within the centrifuge and solids concentration profile across the separation pool and the cake layer.

Based on one or more of these sensor inputs, the computer controller may actuate one or more control devices to control any number of process control variables including, but not limited to input stream feed rate and solids concentration, bowl speed, differential speed, pool height, cake baffle opening, polymer dosage, temperature of input stream, axial feed position and axial conveyor position (with respect to the bowl).

With respect to screen bowl decanter centrifuges in particular, the computerized control system may actuate one or more control devices for adjusting or controlling wash liquid rate, wash nozzle position and flow pattern, and effluent and filtrate recycle.

A particularly important embodiment of this invention is the use of the aforementioned internal sensors. Through the use of internal sensors, methods and apparatus are provided for controlling a centrifuge which includes at least one internal sensor positioned within the bowl for sensing at least one parameter in the centrifuge, an electronic controller associated with the centrifuge and communicating with the internal sensor and a control device for controlling the centrifuge wherein, the control device communicates with the electronic controller and wherein the electronic controller actuates the control device, at least in part, in response to input from the internal sensor.

It will be appreciated that it is quite difficult to sense and communicate parameters in real time within or on the rapidly rotating bowl and/or conveyor. The present invention therefore provides a plurality of novel internal sensors and sensor assemblies for measuring and sensing various internal parameters such as pressure, temperature, pool height, cake and liquid velocity, phase interface, cake height, solids concentration profile and various distances and gaps. Such sensors utilize a variety of technologies including ultrasonic, EMF, optical and acoustic techniques. In addition, several novel communications methods for transmitting and receiving data and power to and from the interior of the centrifuge are provided. Such communications techniques include hard-wired electrical systems, optical systems, RF systems, acoustic systems, video systems and ultrasonic systems.

Other important embodiments of this invention include the use of the computerized monitoring and control system to monitor various parameters with respect to time and thereby diagnose equipment status and conditions such as machine wear, predict failure, aid in preventative maintenance and generally provide a detailed historical record for use in determination of failures and other events, all of which may be important in products liability and other similar matters. Such computerized monitoring can also provide data logs and other extremely useful continuously generated operational histories to control and optimize the machine or process.

The computer controller used in the system of the present invention is preferably a microprocessor controller which is associated with a display device (CRT screen) and input/output device (keyboard). The microprocessor controller may be located at the centrifuge or at a remote location (such as a central control room in a plant). The computerized control may control one or a plurality of centrifuges at a single or plurality of sites.

The above-described computerized control and monitoring system for continuous feed centrifuges provides a comprehensive scheme for monitoring and controlling a variety of input and output parameters as well as a plurality of operational parameters resulting in a greater efficiency, optimization of operation and increased safety.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DESCRIPTION OF THE PREFERRED EMBODIMENT

This invention relates to methods and apparatus for automatically controlling, operating and monitoring continuous feed centrifuges using computer controlled systems and remote sensing devices. Continuous feed centrifuges useful in the control system of this invention generally have a continuous (as opposed to a batch) feed and include a rotating cylindrical or frustronical bowl which interacts with a member movable within the bowl. This movable member typically is a coaxially rotating member and typically rotates at a speed which is different from the rotating speed of the bowl so as to provide a differential rotational speed. The differential speed of the rotating inner member moves the separating higher density phase along the bowl to some discharge location.

Figure 1A:
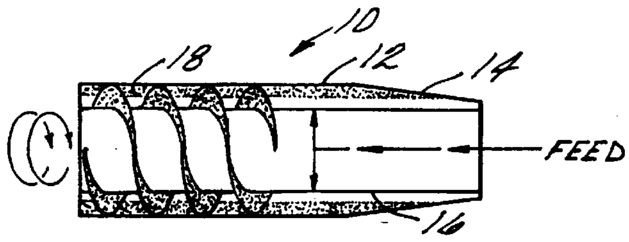
FIG. 1A PRIOR ART
FIGS. 1A–D are schematic sectional views of continuous feed centrifuges, respectively, solid bowl, screen bowl, pusher and scroll/screen centrifuges used in the monitoring and control system of the present invention.
Figure 1B:
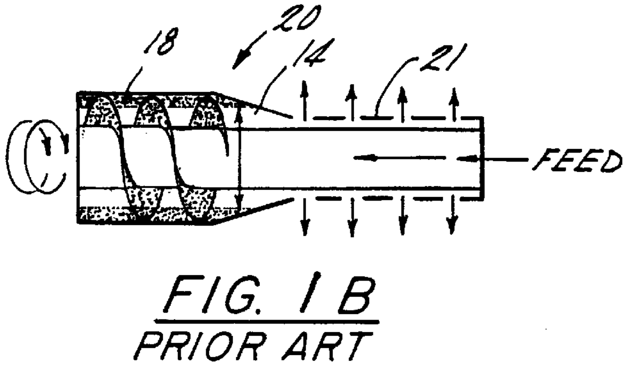
FIG. 1B PRIOR ART
Figure 1C:
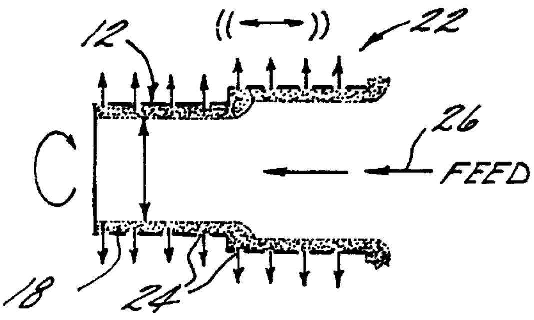
FIG. 1C PRIOR ART
Figure 1D:
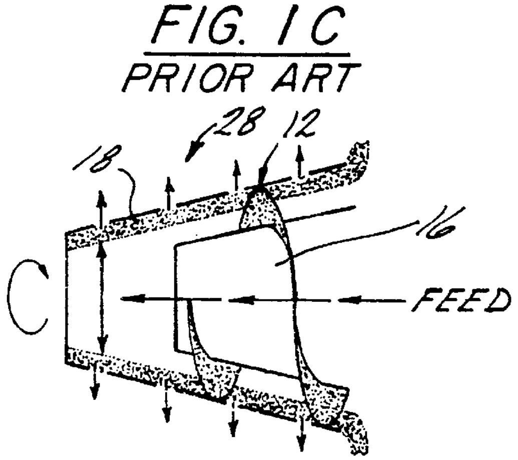
FIG. 1D PRIOR ART

Referring to FIGS. 1A–D, examples of continuous industrial centrifuges contemplated by the present invention are shown. In FIG. 1A, a common sedimenting solid bowl centrifuge often known as a decanter centrifuge is shown at 10. Decanter centrifuge 10 includes a solid outer bowl 12 which terminates at a beach or cone area 14 on the right hand side thereof. Within bowl 12 is an inner hub carrying scroll conveyor 16. Bowl 12 and conveyor 16 rotate at different speeds so as to provide a differential, rotational movement to convey the settled solids. The settled higher density phase is moved along the channel 60*a* (FIG. 3) formed by adjacent flights 60 in a general direction from the feed point to the small conical section of the bowl. An annular pool level 18 is also shown in FIG. 1A. FIG. 1B depicts a sedimenting-filtering screen bowl centrifuge 20. Screen bowl centrifuge 20 differs from solid bowl centrifuge 10 primarily in that the cone 14 terminates at a cylindrical screen region 21 which is perforated so as to emit liquid filtrate therethrough. FIG. 1C depicts a filtering pusher centrifuge 22 which consists of a rotating bowl (comprised of two sections having differing diameters) 12 which has perforations 24 therethrough. In addition, an inner member shown schematically at 26 provides a periodic pushing function so as to push the solid phase cake through the rotating bowl 12. FIG. 1D discloses yet another continuous feed centrifuge known as a scroll screen centrifuge 28. Scroll screen centrifuge 28 includes a conically shaped bowl 12 and a conically shaped worm conveyor 16, both of which rotate at different speeds so as to provide the differential movement described above. All of the aforementioned continuous feed centrifuges shown in FIGS. 1A–D are well-known to those skilled in the art; and all have in common a rotating bowl and an internal member (which may or may not rotate) and which conveys heavy phase materials relative to the interior of the bowl.

In accordance with the present invention, continuous feed centrifuges of the type discussed above are provided with one or more sensors for the sensing of one or more parameters related to the operation of the centrifuge. In addition, a computerized control system which may be located at the centrifuge, near the centrifuge or at a remote location from the centrifuge is provided for interaction with the sensor or sensors in the centrifuge. This computer control system includes a controller which is typically a microprocessor controller and one or more control devices which are actuated in response to a command signal from the controller. Thus, the computer control system will actuate at least one of a plurality of control devices based on input from one or more monitoring sensors so as to provide real time continuous operational control.

Figure 6A:
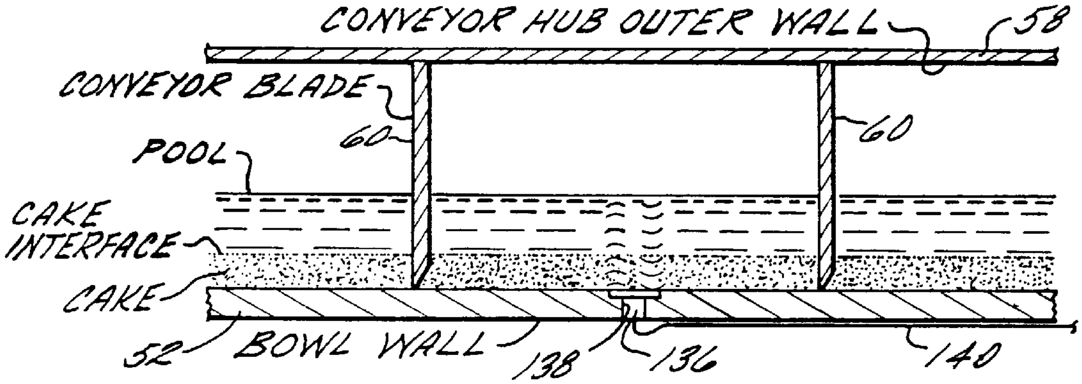
FIGS. 6A–K are enlarged, cross-sectional, elevation views corresponding to the area in FIG. 3 circled and identified as numeral 6 depicting a plurality of sensors and sensor systems for obtaining internal measurements within a continuous feed centrifuge.
Figure 6B:
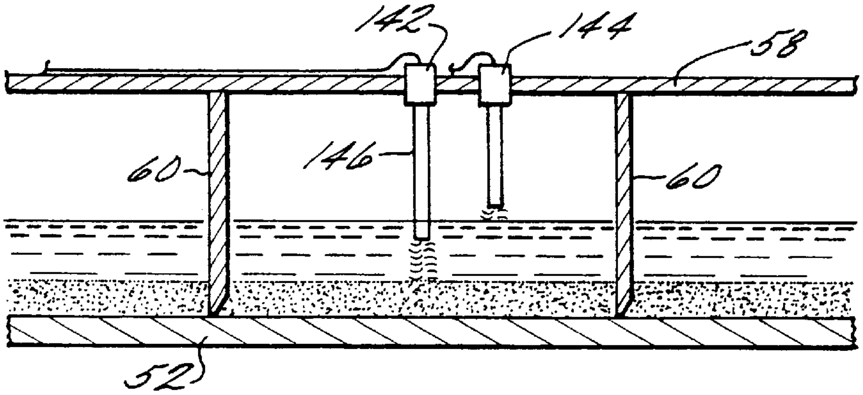
Figure 6C:
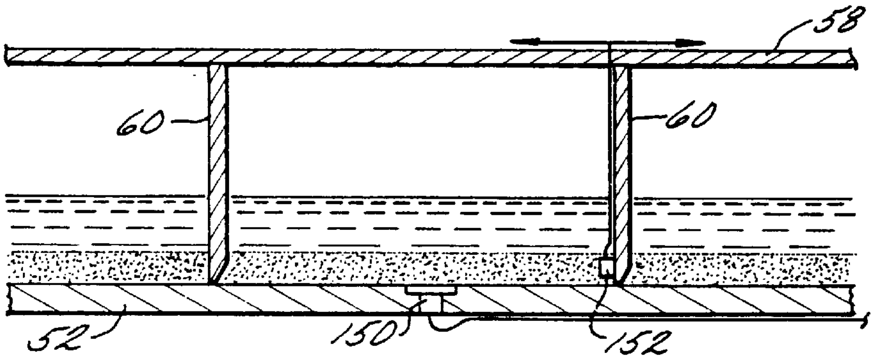
Figure 6D:
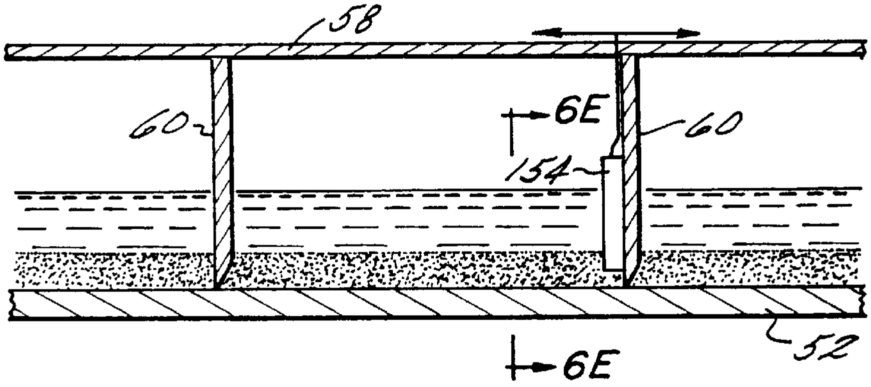
Figure 6E:
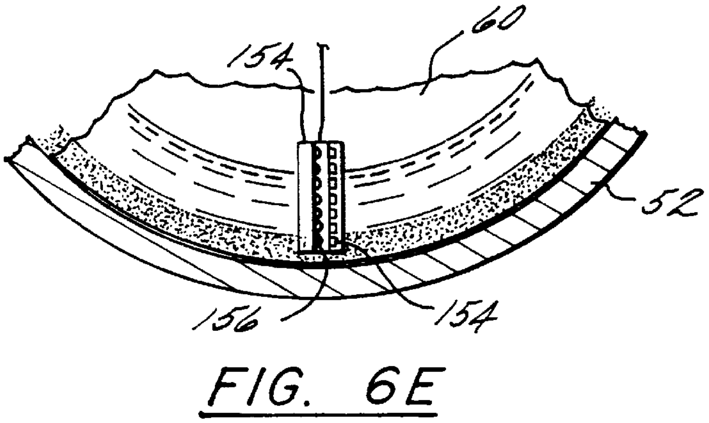
Figure 6F:
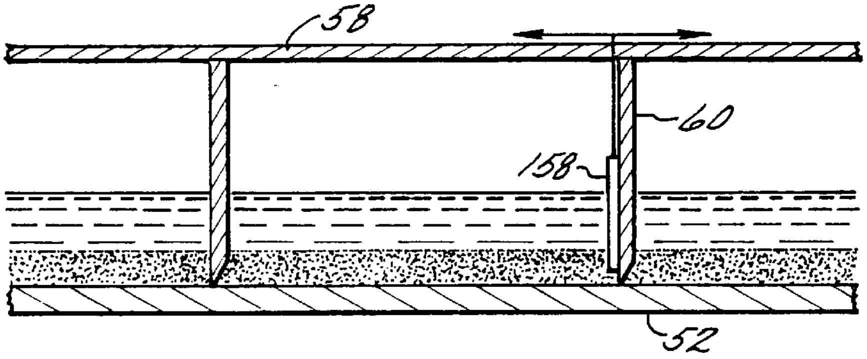
Figure 6G:
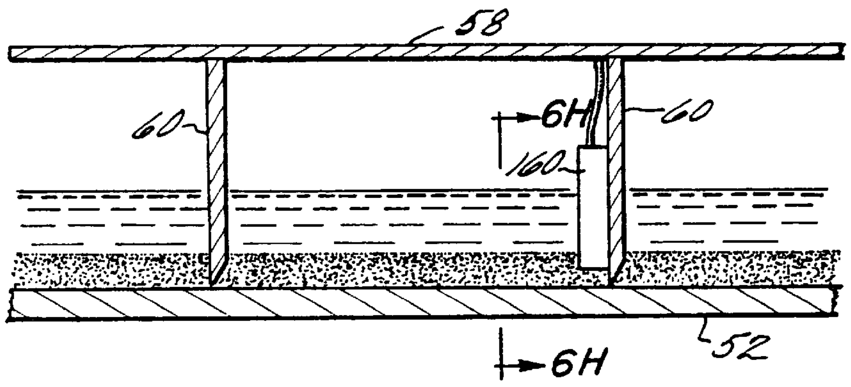
Figure 6H:
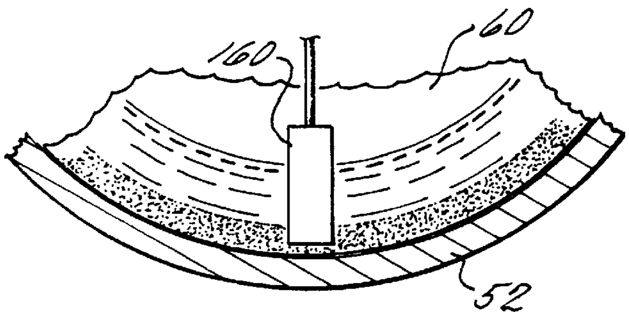
Figure 6I:
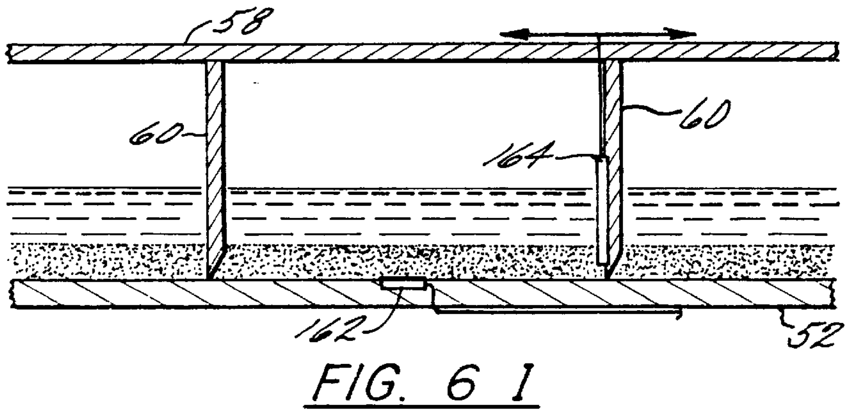
Figures 1, 6J:
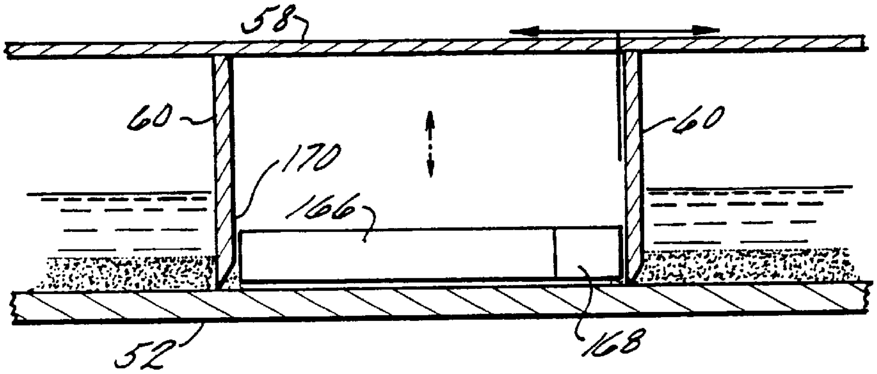
Figures 2, 6J:
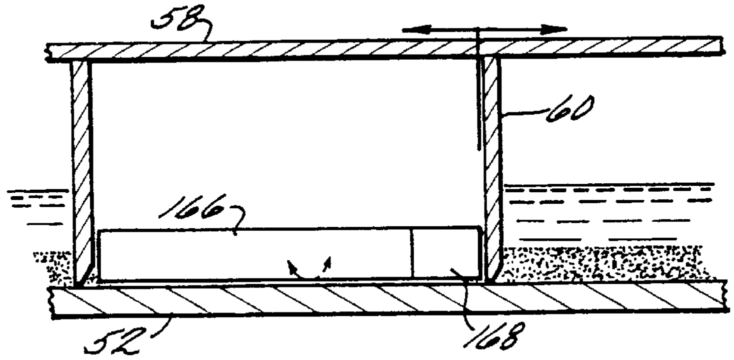
FIG. 2 is a schematic view of the monitoring and control system for continuous feed centrifuges in accordance with the present invention.

Referring now to FIG. 2, a schematic is shown depicting examples of the monitoring sensors, control devices as well as components and features of the control system of this invention. FIG. 2 more particularly shows a centrifuge 30 having associated therewith one or more internal sensors 32 and/or one or more external sensors 34. In addition, the centrifuge is associated with one or more internal control devices 36 and/or one or more external control devices 38. Both the sensors and the control devices communicate through an appropriate communications system 40 with a microprocessor controller 42 which, as mentioned, may be located on the centrifuge, near the centrifuge or at a remote location (such as a control room) away from the centrifuge. Microprocessor 42 has associated therewith a display 44 for displaying data and other parameters, a keyboard 46 for inputting control signals, data and the like, a memory or recorder 47 and a modem 48 for inputting and outputting data to the microprocessor 42 from a remote location. One or more power sources 49 provides power to computer 42 as well as the internal and external sensors and control devices.

Still referring to FIG. 2, the microprocessor controller 42 receives a variety of inputs which have been categorized generally in terms of (1) information which is stored in memory when the centrifuge is produced, (2) information programmed at the site where the centrifuge is to be used, (3) operating parameters sensed by the external sensors 34, input and output stream parameters sensed by the external sensors 34 and internal centrifuge parameters sensed by the internal sensors 32. Examples of information originally stored in memory include information relating to the operation and maintenance of the centrifuge and training information, all of which will be readily available to an operator on video screen 44 associated with microprocessor controller 42. Examples of information programmed at the site where the centrifuge is to be used includes the operating ranges, output parameters desired feed properties and other site specific data such as relative humidity and other environmental factors.

In an important feature of the present invention, a large number of internal and external sensors 32, 34 are disclosed which sense a variety of aspects related to the centrifuge, its operations and its input and output streams. The information or parameters sensed and/or measured by these sensors include operating parameters, input and output stream parameters and internal centrifuge parameters. Examples of the operating parameters which may be sensed by the external sensors 34 of this invention include acoustic emissions, vibration (including magnitude and frequency at both the gear box and bearings), torque (both ac and dc) and speed of rotation of both the bowl and conveyor as well as the differential speed. Examples of parameters sensed by external sensors 34 relating to the input and output streams include the solids concentration, the purity of recovery, the mass flow rate, temperature, constituent analysis (e.g., specific gravity), polymer and other chemical additions, particle size distribution, moisture of cake/density of cake and volumetric flow rate.

The internal centrifuge parameters sensed using internal sensors 32 include the sensing of the height of the cake as it travels along the internal member within the centrifuge, the height of the interface including those situations where there are two or more liquid phases such as oil/water or emulsion phases, the height of the pool, the internal pressure within the bowl and gaps between structural elements housed within the bowl such as any gaps between, for example, the bowl and the worm conveyor. More specifically, such gaps include the cake baffle clearance from the bowl wall, the clearance between the bowl and the conveyor and the weir overflow. Still other parameters internally sensed in accordance with this invention include the temperature within the bowl and along the conveyor, the position of certain internal members such as the feed inlet and the scroll member, the cake and/or effluent surface velocity, solids concentration of the cake and/or the pool, particle size distribution within the bowl and the actual internal separation taking place which can be shown by an imaging sensor, e.g., shown visually by a camera or the like. It will be appreciated that the aforementioned internal and external centrifuge parameters sensed using the control system of the present invention will be more fully explained in detail hereinafter with regard to the several examples.

Still referring to FIG. 2, the outputs from the microprocessor controller may be generally categorized as (1) data stored in memory 47 associated with the microprocessor controller 42, (2) operational control of the centrifuge and (3) real time information provided to the operator at the monitor 44 associated with the microprocessor 42. Referring more particularly to the data stored in memory, it will be appreciated that the computerized monitoring and control system of this invention may utilize the aforementioned sensors to monitor various parameters with respect to time and thereby provide a detailed historical record of the centrifuge operation. This record may be used by the microprocessor to model centrifuge operation, adjust models for centrifuge operation or generally learn how the centrifuge behaves in response to changes in various inputs. This record may also be used to provide a data log, provide preventative maintenance information, predict failure and predict machine wear.

Of course, an important feature of this invention is that in response to the many parameters sensed by the sensors 32, 34 associated with the centrifuge 30, the operation of the centrifuge and thereby its ultimate efficiency and functioning can be adjusted, changed and preferably optimized. Based on the sensor input to the microprocessor 42, the microprocessor may actuate a number of internal and external control devices 36 and 38 to control a number of operations including, for example, adjustments to the speed of rotation, various baffle setting (e.g., cake baffle opening), flow rate of input stream, chemical additions such as polymer additions, differential speed, adjustment to absolute speed of bowl (as opposed to differential speed), temperature, pressure, pool heights, concentration of solids/liquids in the input stream (for example, the dilution of the feed slurry may be adjusted to reduce hindered settling), conveyance speed of cake, axial feed positions and axial conveyor positions. In some cases, the control devices will be actuated if certain sensed parameters are outside the normal or preselected centrifuge operating range. This operating range may be programmed into the control system either prior to or during operation. The foregoing operational controls and examples of actual control devices which will provide such operational controls will be described in more detail hereinafter.

Other outputs include the real time status of various parameters at the centrifuge by the operator. Thus, the operator may use the computerized control and monitoring system of the present invention to diagnose the present condition of equipment, order spare parts including using a modem/fax 48 for spare parts ordering, obtain a read-out of operating parameters and as part of an overall Supervisory Control and Data Acquisition (SCADA) system. As is well known, in a SCADA system, microprocessor devices convert plant measurement and status inputs into computer data for logging and transmission to higher level processors. These supervisory controllers make strategic decisions for the operation of a process unit or plant and send out set points to dedicated controllers which will make the changes to actuators and ultimately the process. The SCADA network therefore connects to many controllers and field devices to gather information and make global decisions.

Figure 3:
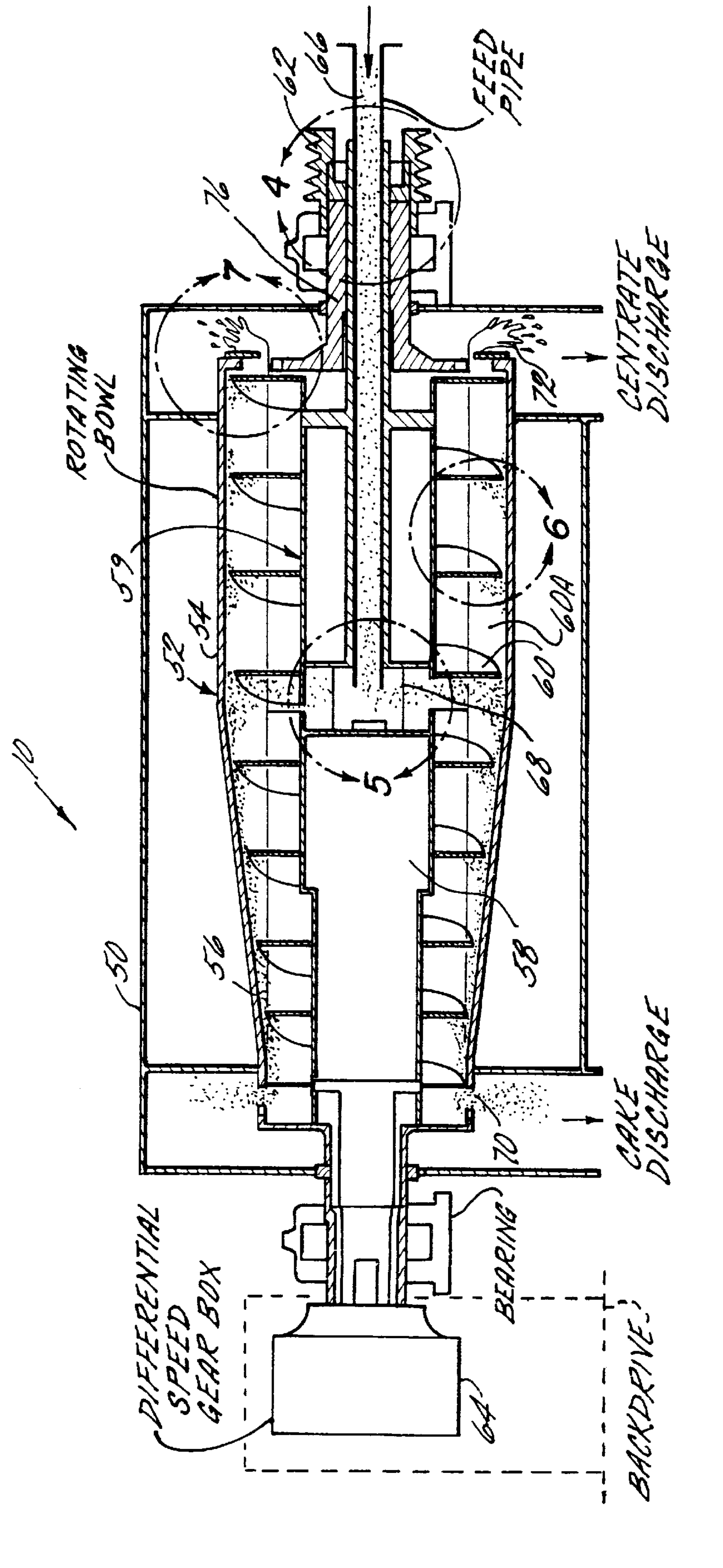
FIG. 3 is a cross-sectional elevation view of a solid bowl centrifuge used in the monitoring and control system of the present invention.

Continuous feed centrifuges of the type discussed above in FIGS. 1A–D present extremely difficult problems with respect to the design and installation of sensors associated with the centrifuge, the acquisition of various measurements (articularly of parameters internal to the centrifuge), the ability to communicate data and power into and out from the centrifuge as well as the ability to provide control devices within the centrifuge and actuate those control devices in response to a command from a control computer. These difficulties arise from the fact that the continuous feed centrifuges of the type described herein include a bowl which rotates at an extremely high rate (e.g., 4000 or greater rpm) and typically include a conveyor which is also rotating at a high rate. The ability to deliver power and data to and from this rotating machine and provide appropriate functional sensor systems therefore represents extremely difficult challenges. However, in accordance with the present invention, a number of distinct sensor systems and communications schemes are presented which overcome the substantial difficulties inherent in a continuous feed centrifuge. For ease of illustration and understanding, the several examples of sensors and communication schemes will be discussed with regard to a solid bowl centrifuge of the type disclosed in FIG. 1A. Referring to FIG. 3, the solid bowl centrifuge of FIG. 1A is shown in greater detail and will now be briefly described.

In FIG. 3, a decanter solid bowl centrifuge is shown at 10 and includes a housing or case 50. Within housing 50 is a solid bowl 52 which includes a cylindrical section 54 and a beach or conical section 56. Within bowl 52 is an inner hub 58 carrying the worm conveyor 59 composed of a plurality of spiral conveyor blades 60. The hub 52 is driven by a motor (not shown) which is connected to a main drive connection or sheave 62. Sheave 62 is connected to bowl head flange 76 which in turn is connected to bowl 52. Bowl 52 and hub 58 are both connected through a differential speed gear box 64 such that the bowl and hub are rotated at high, slightly different angular speeds. A feed pipe 66 extends into the centrifuge through the main drive connection 62 and emits the feed (which is comprised of at least two phases such as a slurry (e.g., liquid and solid mixture)) near the center of the hub. Feed pipe 66 is passed through a conveyor trunnion (see FIG. 4A) and is stationary relative to the rotating bowl and conveyor. The feed then enters a compartment formed inside the conveyor hub where it is accelerated to rotational speed before it discharges to the separation pool formed between the hub and inner surface of the bowl. The feed is subject to centrifugal forces, which accelerate the settling tendency of each phase with respect to the other phases. The heavy phase accumulates against the inner bowl wall. Because of the differential rotation of the worm conveyor and the bowl, the heavy phase or sometimes solid sediment is pushed or scrolled to a cake discharge opening 70 at the smaller or conical end 56 of bowl 52. The cake discharge is known as the heavy phase output or discharge. In turn, the liquid or light phase output or discharge is driven to opposite end or cylindrical section 54 of bowl 52 and is discharged through the centrate discharge opening 72.

Having described a conventional solid bowl centrifuge, examples of signal/power communications schemes, internal and external measurement systems and sensors, and control devices will now be described. More particularly, FIGS. 4A through F are examples depicting a plurality of schemes for providing data and power access into and out from the interior of the centrifuge. All of FIGS. 4A through F are detailed enlargement views of that portion circled in FIG. 3 and identified by the numeral 4. That portion of FIG. 3 identified by as numeral 5 relates to FIGS. 5A–B which disclose examples of methods for routing wire or fiber optics through the feed pipe in order to gain a signal/power transmission path into the centrifuge. Similarly, that portion of FIG. 3 which is circled and identified by the numeral 6 are shown in FIGS. 6A–K and comprise examples showing a number of various internal sensors and measurement systems. Finally, that section of FIG. 3 identified by the circular section shown as numeral 7 corresponds to FIGS. 7A–E and describe examples for several control devices (actuators) for adjusting centrifuge operation in response to a command from the control computer.

Data and Power Transmission Into and Out From Interior of Centrifuge

Figure 4A:
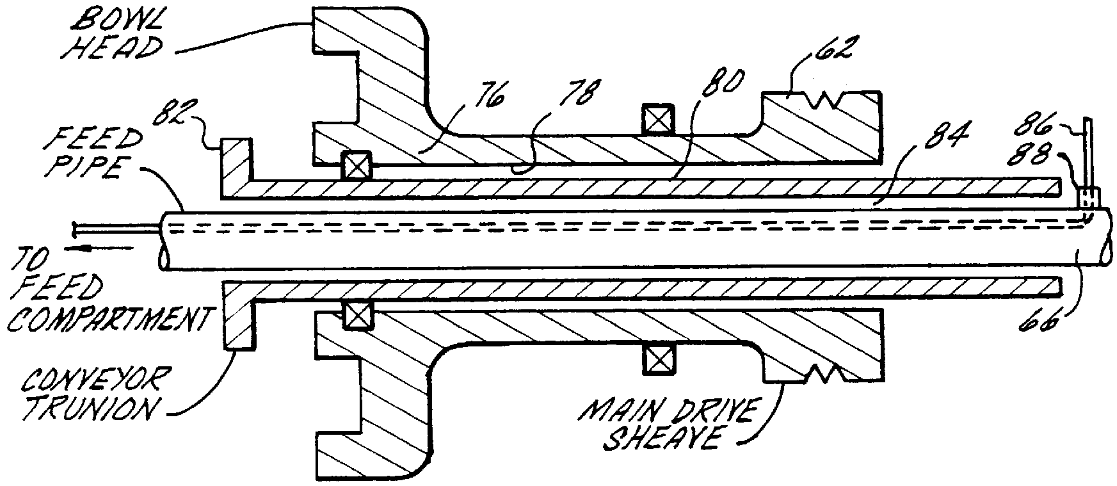
FIGS. 4A–F are enlarged, cross-sectional side elevation views through that portion of FIG. 3 circled and identified as numeral 4, depicting various schemes for communication into and out from a continuous feed centrifuge.

Referring to FIG. 4A, a bowl head 76 is shown which attaches to bowl 52. Bowl head 76 has an axial opening 78. A conveyor trunnion 80 extends through opening 78 and includes a flange 82 which attaches to conveyor or hub 58. Conveyor trunnion 82 also includes an axial opening 84 and feed pipe 66 extends through opening 84 in a known fashion. In accordance with the present invention, one or more electrical cables or optical fibers 86 penetrates the stationary feed pipe 66 at a pressure tight fitting 88. This cable (which may be electrical wire or fiber optic) then travels through the interior of feed pipe 66 into the interior of the centrifuge and specifically into the center of hub 58. The fiber/cable 86 may be secured to an interior wall of the feed pipe and will run into the feed compartment for connection to sensors and the like. Thus, the FIG. 4A communications scheme allows for the transmission of electrical signal and power as well as optical signal to be transmitted through the feed pipe and into the interior of the centrifuge.

Figure 4B:
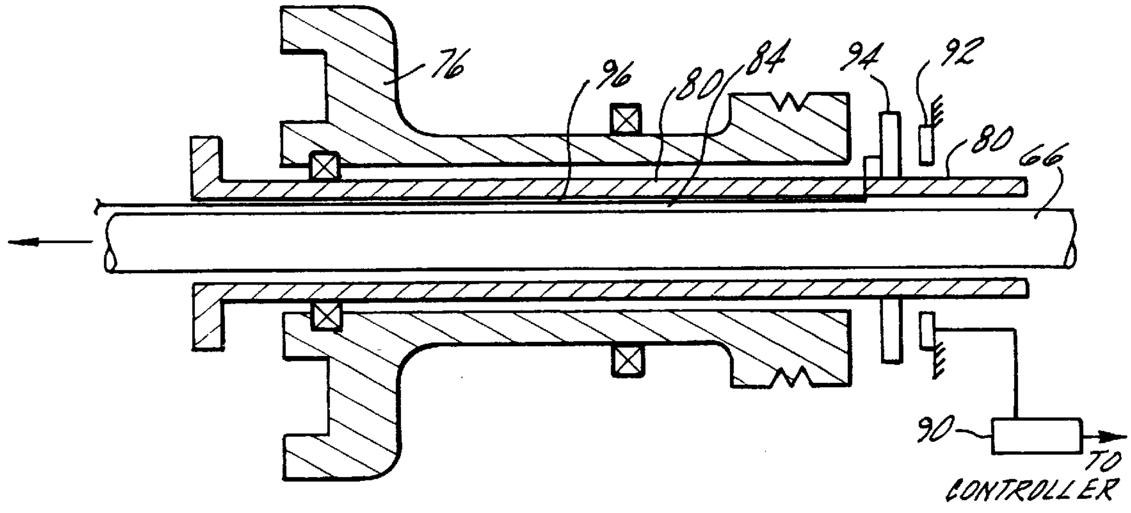

FIG. 4B depicts an alternative scheme to that shown in FIG. 4A. In FIG. 4B, electrical radio frequency (RF) transmission of signal and power is shown. Such RF transmission is accomplished by use of an RF transmitter/receiver 90 which communicates with a stationary RF antenna 92. Stationary RF antenna 92 is spaced from and in communication with a rotating RF antenna 94 which is attached to a collar connected to the conveyor trunnion 80. Rotating RF antenna 94 is then hardwired using cable 96 in the annular space 84 to some point within the interior of the centrifuge for connection to a sensor or other device. It will be appreciated that data corresponding to parameters measured by internal sensors 32 will be transmitted through wire 96 to rotating antenna 94. This data will then be sensed by stationary RF antenna 92 and received by receiver 90. In turn, the data will then be sent to the controller 42. Alternatively, command signals and other information from the controller 42 may be sent to the RF transmitter 90 to stationary antenna 92 and then to rotating RF antenna 94. This data will then be transmitted along wiring 92 to a suitable control device 36 within the centrifuge. In addition to the transmission of signals and data, power may also be transmitted using the electrical RF transmission system shown in FIG. 4B in a known manner.

Figure 4C:
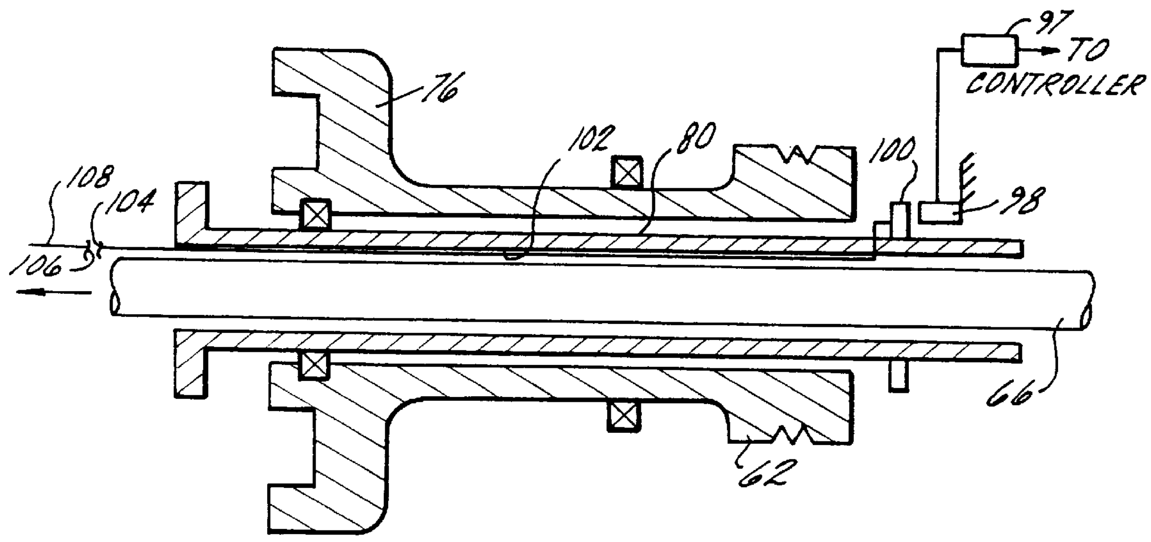

FIG. 4C depicts a scheme for the optical transmission of signals using the conveyor trunnion. In FIG. 4C, stationary optical coupling and converter electronics 98 communicate with a rotating optical coupling 100 which has been mounted on rotating conveyor trunnion 80. In turn, rotating optical coupling 100 is hardwired via optical fibers 102 to some location or locations within the centrifuge. As in the other examples, the optical fibers 102 will be connected to one or more sensors and/or one or more control devices. The fiber optic bundle 102 may be secured to the conveyor trunnion and connected to an optical coupling 104. In turn, an optical coupling 106 will be mounted on the conveyor hub and connected to a second fiber optic bundle 108. (It will be appreciated that other optical couplings may be advantageously used in this optical transmission scheme such as, for example, between the maindrive sheave and the bowl head). As discussed regarding the other embodiments, data from the control computer may be sent through the optical converter 97 to the stationary optical coupling 98 whereupon an optical signal will be transmitted to the rotating optical coupling 100. The signal received in rotating optical coupling 100 will then be transmitted to the fiber optic bundle 102 and on into the centrifuge to a sensor and/or a control device. Similarly, information from an internal sensor will be transmitted along fiber optic bundle 102 to optical coupling 100 whereupon the signal will be transmitted to the stationary coupling 98, converter electronics 97 and then back to the computer 42 for processing.

Figure 4D:
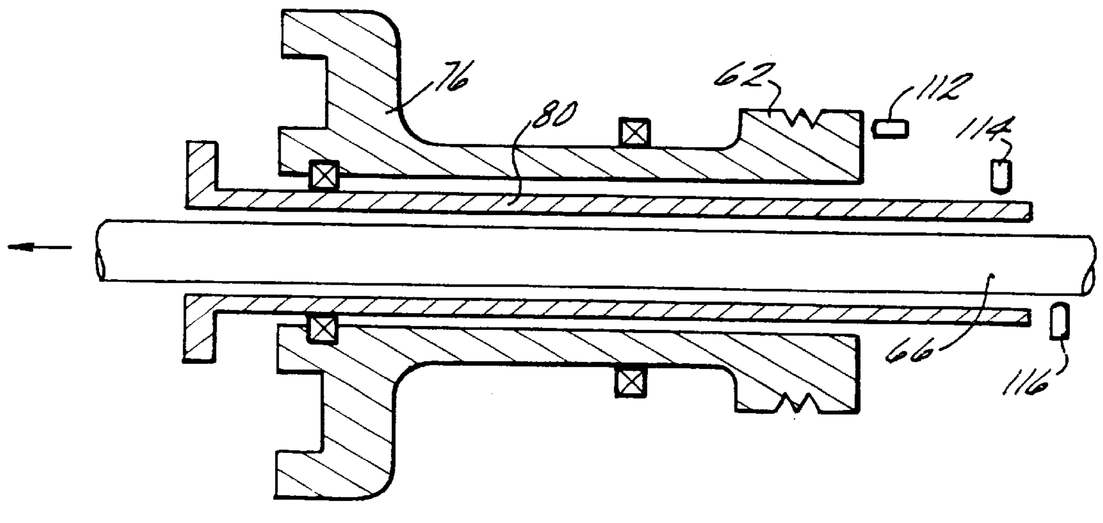

FIG. 4D depicts an acoustic measurement or signal transmission scheme. In FIG. 4D, known acoustic transducers are positioned at various locations in and along the centrifuge. In this example, acoustic transducer 112 is positioned adjacent the main drive sheave for picking up acoustic signals from the bowl while an acoustic transducer 114 is located adjacent the conveyor trunnion 80 for picking up signals associated with the conveyor 58. A third acoustic transducer 116 is located adjacent the feed pipe 66 for monitoring acoustical information related to the feed pipe. These acoustic transducers 112, 114 and 116 may be used for signal transmission, that is, the transmission of data signals into and out from the centrifuge. In addition, the acoustic transducers may be used to obtain acoustic measurements of acoustical signals being generated by various components of the centrifuge. These acoustic signals or measurements may be used to evaluate and monitor different parameters of the centrifuge operation and processing.

Figure 4E:
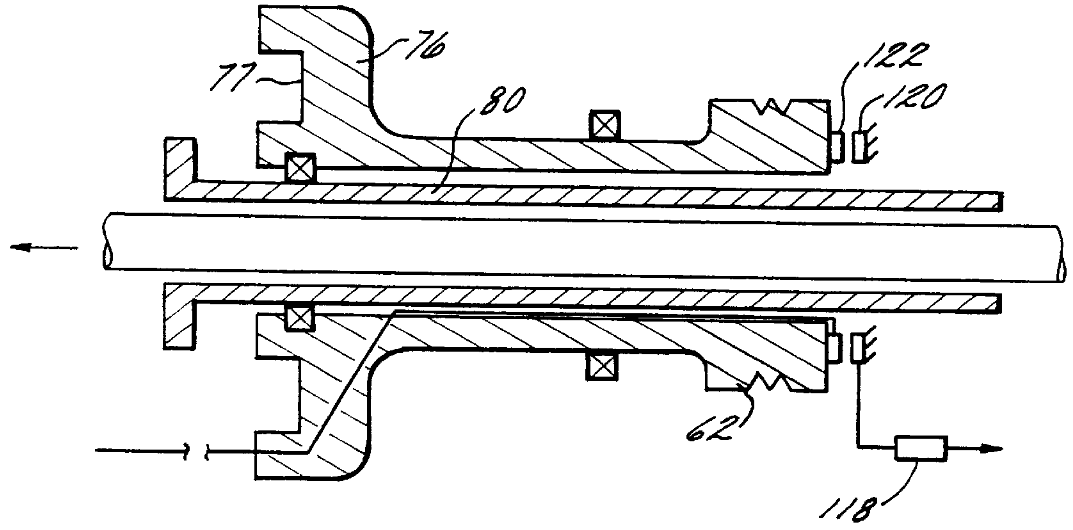
Figure 4F:
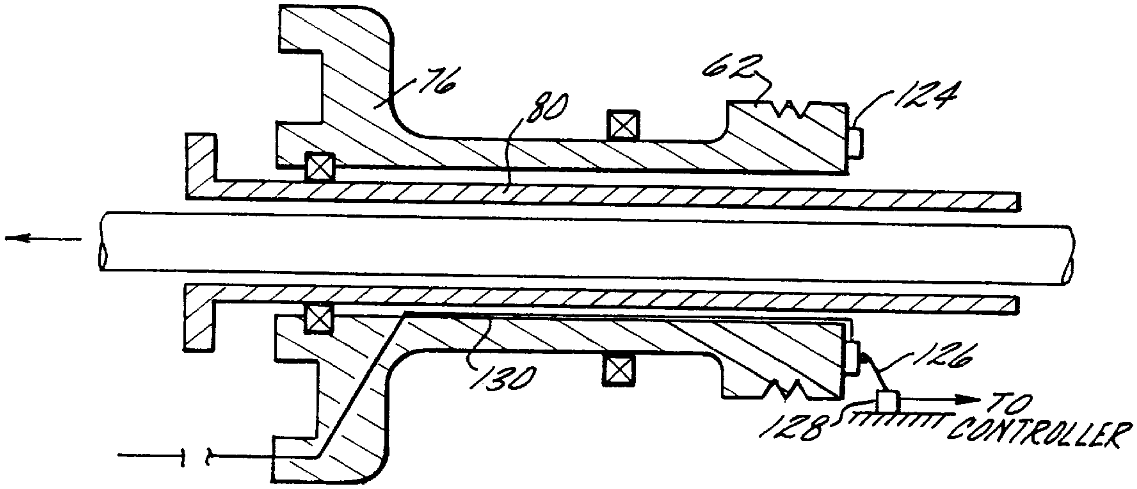

While the FIGS. 4A–C embodiments disclose several methods for transmitting data and power into and out from the conveyor, FIGS. 4E and 4F depict several methods for conveying signals and power into and out from the interior of the bowl. In FIG. 4E, a scheme for providing signal and power source transmission based on electrical RF or optical signals is shown. In this scheme, the element identified at 118 comprises any known RF transmitter/receiver or an optical converter. Element 118 is connected to a stationary RF antenna or optical coupling 120. In turn, stationary RF antenna or optical coupling 120 communicates with a rotating RF antenna or optical coupling 122 which is positioned on the rotating main drive sheave 62. An electrical wire or fiber optic bundle is connected to antenna/coupling 122 and travels along the interior surface of bowl head 76 within annular space 78. This wire/fiber optic bundle may be passed through an opening formed through head flange 77 where it will pass through several connectors and on into the bowl for connection to sensors and control devices. In FIG. 4F, slip rings are used to transmit electrical signals and power into and out from the bowl. Thus, a rotating slip ring 124 is mounted on the outer flange surface of main drive sheave 62. A brush contact 126 is used to maintain continuous contact between rotating slip ring 124 and a signal converter, controller or other device 128. As in the other embodiments described above, electrical wiring may be used to interconnect rotating slip ring 124 to sensors or control devices within the centrifuge. Preferably, the wiring is located through the bowl head flange to another connector (not shown) for ease of assembly or disassembly. This other connector is located in the bowl and will transmit the data and/or power to sensors or control devices associated with the bowl.

Distribution of Wire and/or Fiber Optic Cable Through Feed Pipe

Figure 5A:
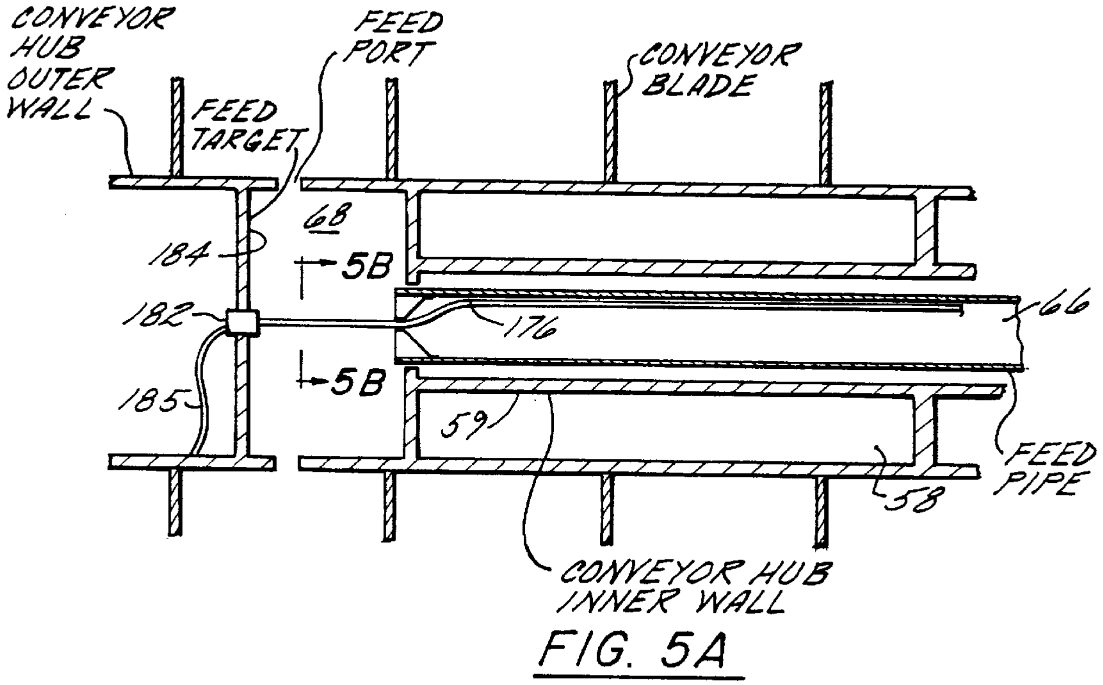
FIGS. 5A–C are enlarged, cross-sectional, elevation views corresponding to the area circled and identified as numeral 5 on FIG. 3, which disclose several schemes of providing electrical and/or optical wiring through a continuous feed centrifuge.
Figure 5B:
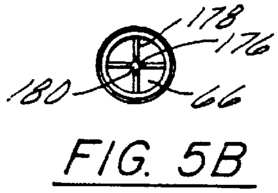
Figure 5C:
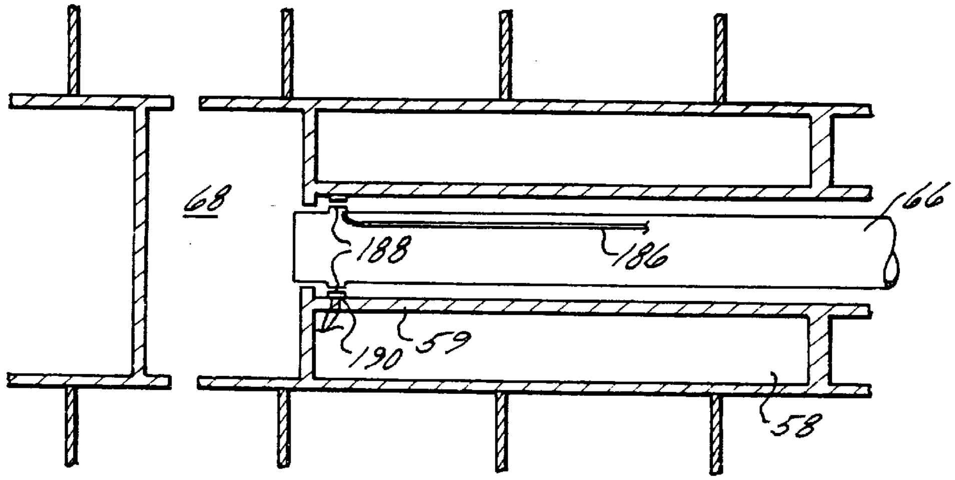

FIGS. 5A and B disclose details for the routing of wire or fiber optics through the feed pipe for use in the relevant communications schemes of FIG. 4. Such routing preferably utilizes a rotary coupling or RF transmitter in the feed compartment. Specifically, and referring to FIGS. 5A and B, an electrical or optical rotary coupling is shown wherein a cable or fiber optic bundle 176 is secured to the inside of feed pipe 66. Feed pipe 66 includes a spider-like support centering clamp 178 (see FIG. 5B) which includes a central opening 180 for receiving cable or fiber optic bundle 176. Cable 176 then travels through the feed compartment 68 and into a rotary coupling 182 which is secured to the feed target wall 184. It will be appreciated that spider support 178 aligns the cable/fiber optic bundle with rotary coupling 182 while allowing the passage of the feed slurry. A second cable/fiber optic bundle 185 is secured to the inner surface of hub 58 and is run along the length of the hub so as to mate with an appropriate sensor such as the video camera of FIG. 6K, the light array sensor of FIG. 6E or any of the other sensors described hereafter in FIGS. 6A–D and 6E–K which are mounted to hub 58 or one or more of the blades 60. FIG. 5C depicts an electrical RF transmission scheme for signal and power through the feed pipe 66. In this scheme, an electrical wire 186 is secured to the interior of feed pipe 66 and terminates at one or more stationary RF antennas 188 which is positioned along the exterior of feed pipe 66. A rotating RF antenna is positioned on the surface of conveyor hub 58 and is spaced from but in communication with stationary RF antenna 188. A wire is then run from rotating RF antenna 190 to an appropriate sensor such as those described hereafter in FIGS. 6A through 6K which are located in the wall of hub 58 or one or more of conveyor blades 60.

Internal Sensors and Sensor Systems

Turning now to FIGS. 6A–6K, several examples of sensors for use in the computerized control or monitoring system of the present invention will now be discussed (however, it will be appreciated that FIG. 4D depicted an acoustic sensor system which both acts as a communications link for signal transmission and also acts as a sensor system for sensing various acoustic activities in different portions of the centrifuge including, the bowl, the conveyor and the feed pipe).

Referring to FIG. 6A, an ultrasonic sensor or transducer is shown at 136 having been mounted flush to the inside diameter of the wall of bowl 52. Ultrasonic transducer 136 is connected via a transmission wire 140 to microprocessor controller 42. Transducer 136 sends and received ultrasonic pulses into the space defined between hub 58 and the interior wall of bowl 52 and between various conveyor blades 60. Thus, the signals from transducer 136 will pass through the cake, the cake interface and into the pool as shown in FIG. 6A. Transducer 136 will be able to therefore measure or sense pool height, cake interface, solids concentration in the cake and/or the pool (e.g., a solids concentration profile) as well as the conveyor blade tip clearance (that is the clearance between the tip of each blade 60 and the wall of bowl 52). This latter measurement may be made once per each differential revolution. It will be appreciated that transmission wire 140 may enter and exit the centrifuge using any of the relevant communication schemes shown in FIGS. 4A through 4F; and preferably, the communication and connection scheme of FIG. 4F is utilized with the ultrasonic transducer of FIG. 6A.

While FIG. 6A depicts an ultrasonic sensor located in the bowl wall, FIG. 6B depicts an ultrasonic sensor which is positioned in the rotating conveyor 58. More particularly, first and second ultrasonic transducers 142, 144 are mounted to the conveyor hub outer wall 58. Transducer 142 is centrally mounted between a pair of blades 60 while transducer 144 is mounted closer to one of the blades. In addition, transducer 142 is mounted on an extension rod 146 so as to sense the interface between the cake and pool whereas transducer 144 is not mounted on an extension rod so as to be able to sense the height of the pool. Wires 148 interconnect transducers 142 and/or 144 to the exterior of the centrifuge using any of the suitable wiring schemes of FIGS. 4A and 4F. Preferably, transducers 142, 144 run through the feed compartment 68 through a rotary coupling such as shown in detail in FIGS. 4A and FIG. 5A. It will be appreciated that the ultrasonic transducers 142, 144 of FIG. 6B can measure pool height and/or cake interface. It will also be appreciated that any number of ultrasonic transducers may be mounted through hub outer wall 58 so that measurements along the entire length of the conveyor may be taken. Similarly, in connection with FIG. 6A, any number of spaced ultrasonic transducers may also be mounted to the wall of the bowl so as to obtain information along the entire length of the centrifuge. By using a plurality of such internal sensors spaced along the length of the centrifuge, a profile of, for example, solids concentration in the lighter and higher density phases may be obtained.

An example of a suitable ultrasonic sensor is disclosed in U.S. Pat. No. 5,148,700 (all of the contents of which are incorporated herein by reference). A suitable commercially available ultrasonic sensor is sold by Entech Design, Inc. of Denton, Tex. under the trademark MAPS®. Preferably, the sensor is operated at a multiplicity of frequencies and signal strengths. Ordinarily, sensors operate to "see" the line of predetermined density in the plane of investigation. In other words, the ultrasonic signal is not returned by densities lighter than the predetermined density that lie above that line, and the signals do not penetrate to the greater densities that lie below the predetermined sludge density. However, by changing the frequency and strength of the signal, the predetermined density to be investigated is also changed. The aforementioned ultrasonic technology can be logically extended to millimeter wave devices. Suitable millimeter wave radar techniques used in conjunction with the present invention are described in chapter 15 of Principles and Applications of Millimeter Wave Radar, edited by N. C. Currie and C. E. Brown, Artecn House, Norwood, Mass. 1987.

FIG. 6C depicts a pressure transducer for sensing pressure within the interior of the centrifuge. Pressure transducer may be mounted either in the bowl wall 52 and/or the pressure transducer may be mounted on or in or partially through a conveyor blade 60. Alternatively, the pressure transducer may be mounted through the hub 58. Thus, pressure transducer 150 is shown mounted in bowl wall 52 and pressure transducer 152 is shown mounted on conveyor blade 60. The wires leading from transducers 150, 152 may be interconnected to the exterior of the centrifuge using any applicable interconnection scheme described in FIGS. 4A through F. Pressure transducers 150, 152 may measure or sense the pressure or liquid head which must be compensated for G-force of the pool.

FIGS. 6D–E depict an internal measurement sensor which utilizes a light array. More particularly, as best shown in FIG. 6E, a light array sensor 154 is mounted to a conveyor blade 60 adjacent a light source 156. The light source 156 and the array of light sensors 154 are positioned along the radius of the blade 60. The light sensed will vary depending upon obstructions in the light path. Thus, as the pool height, cake interface or solids concentration varies, the light sensed by sensor 154 will similarly vary. The light emissions from sensor 154 of FIGS. 6D–E will measure pool height, cake interface and solids concentration. Again, connection between the light sensor and the exterior of the centrifuge may be made by any of the suitable connecting schemes of FIGS. 4A through F with preferred connecting schemes utilizing FIGS. 4A–C or the scheme of FIG. 5A.

FIG. 6F depicts an electronic level sensor shown generally at 158. Level sensor 158 mounts to conveyor blade 60 and may consist of any number of suitable electronic sensors. For example, level probe 158 may be a conductive probe which changes resistance as pool height changes. Alternatively, level probe 158 may be a capacitance probe which is also responsive to pool height and cake interface. Thus, electronic level probe 158 will sense both pool height changes and cake interface changes. Level probe 158 will communicate to the exterior of the centrifuge using any of the relevant communications schemes in FIGS. 4A–F and particularly preferred communications schemes are those shown in FIGS. 4A, 4B and 5A.

FIGS. 6G–H depict an acoustic array sensor 160 mounted on a conveyor blade 160 as best shown in FIG. 6H. Acoustic array 160 may be excited so as to emit acoustic signals. These acoustic signals will produce changes in the acoustic response as the pool height and cake height vary. Thus, the acoustic array shown in FIGS. 6G–H will provide sensing and measurement of the pool height and cake height. Acoustic array 160 may communicate with the exterior of the centrifuge using any of the relevant communications schemes shown in FIGS. 4A–F and preferably will utilize the schemes of FIGS. 4A, 4B and 5A.

FIG. 6I depicts a temperature sensor which may be mounted to either the bowl, the conveyor or both. Thus, a temperature transducer or probe 162 is shown mounted flush to the inner diameter of bowl wall 52 while a temperature sensor 164 is mounted to a blade 160 of a conveyor. The temperature sensors may be positioned and located so as to measure the temperature of the pool liquid, and/or the cake, and/or the bowl wall, and/or the conveyor blade, and/or the hub. Of course a large number of temperature transducers can be located within and along the length of the bowl wall and/or conveyor so as to provide a "real time" temperature record along the entire length of the centrifuge.

FIGS. 6J-1 and 6J-2 depict a baffle 166 which is located between a pair of adjacent conveyor blades 60. Baffle 166 is associated with a position transducer 168. Baffle 166 has several modes of operation. In a first mode of operation, baffle 166 is mounted between blade 60 so as to move radially from the rear outer wall of hub 58 towards the inner wall of bowl 52. As the baffle moves along the radial path, position transducer 168 will measure the linear motion of the baffle. In an alternative mounting scheme, baffle 166 is hinged along line 170 and position transducer 168 measures rotary motion of baffle 166. In an actual centrifuge, baffle 166 can take the form of an axial cake baffle or a cake restriction flow control wear plate, all of which are described in detail in U.S. application Ser. No. 08/468,205, now U.S. Pat. No. 5,643,169, all of the contents of which are incorporated herein by reference. In addition, the baffle 166 may be used to define conveyor position relative to the bowl wall. Position transducer (proximity sensor) 168 may utilize any of a number of known measurement technologies and can take the form of an ultrasonic distance transducer which is directly coupled during motion and converts to a digital signal via an encoder or may be directly coupled to motion for change relative to change in electrical properties such capacitance, inductance or resistance. Of course, position transducer and baffle 168, 166 may communicate (both for power and signal) to the exterior of the centrifuge using any of the communications schemes described above, particularly the schemes of FIGS. 4A and B.

Figure 6K:
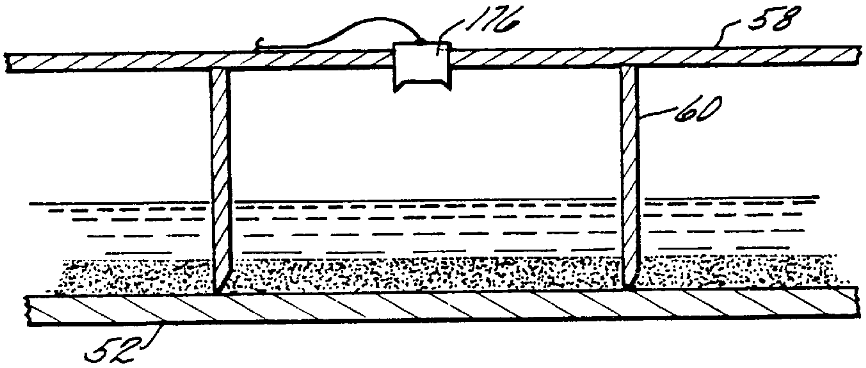

In accordance with yet another embodiment of this invention, an internal sensor 32 used within the centrifuge comprises a sensor for imaging the interior of the centrifuge such as the video camera shown at 176 in FIG. 6K. Video camera 176 may consist of any known miniaturized camera (such as a CCD camera) and may be located on the conveyor hub 58 or in another appropriate location such as the bowl wall or blade. The video camera 176 is preferably connected using the connection scheme of FIG. 4A or 5A and the video camera may be used to detect pool surface flow phenomena, cake characteristics and other process activities within the centrifuge. Of course, a plurality of video cameras may be used throughout the interior of the centrifuge to provide the operator with a real time view of the entire centrifuge operation along the entire length of the centrifuge. A description of a video sensor system for use in mineral processing operations and which may be useful herein is described in by J. M. Oestreich, et al., Minerals Engineering, Vol. 8, Nos. 1–2, pp. 31–39, 1995, incorporated herein by reference. The color sensor system described therein comprises a color video camera, a light source, a video-capture board, a computer, and a computer program that compares measured color vector angles to a previously stored calibration curve. Several cameras may be connected to a single color sensor computer or a single camera may simultaneously observe several locations using a network of fiber-optic cables.

It will be appreciated that many of the sensors used to sense internal centrifuge parameters such as acoustic, ultrasonic, radio frequency, microwave and laser based sensors can operate non-intrusively. By "non-intrusively", it is meant that sensors can sense internal parameters from either the exterior of the centrifuge or, alternatively can sense parameters from the interior of the centrifuge but without having to physically enter the solid or liquid phases.

Internal Control Systems

Figure 7A:
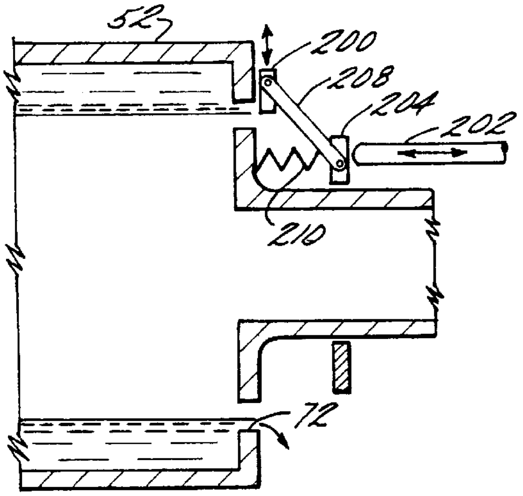
FIGS. 7A–J are respective, cross-sectional and end views corresponding to the area of FIG. 3 circled and identified as numeral 7, which depict schemes for adjusting the pool height of a continuous feed centrifuge.
Figure 7B:
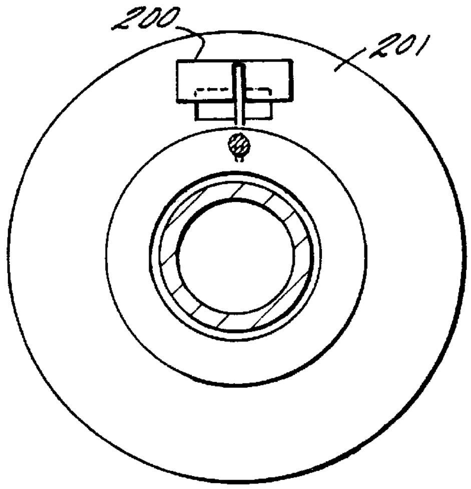

Turning now to FIGS. 7A–J, five embodiments depicting internal control devices for controlling a centrifuge in response to control signals from a central computerized control system will now be described. These several embodiments provide an automatic adjustment mechanism for adjusting the pool height in response to control signals. In the first embodiment of FIGS. 7A–B, a mechanical weir plate positioning system is disclosed. FIGS. 7A–B disclose the liquid phase discharge end of the centrifuge and for ease of understanding, the conveyor and trunnion are not shown. A weir plate 200 is transversely mounted to a positioning rod or sleeve 202 via a throw out bearing 204 and a connecting shaft 206. The throw out bearing 204 is attached to the centrifuge using a G-force counter balance spring 210. It will be appreciated that as the positioning rod 202 moves laterally to the left or the right, throw out bearing 204 will similarly be moved to the left and the right which in turn urges pivotally mounted shaft 208 to cause weir plate 200 to slide radially outward or inward. As weir plate 208 slides inward toward the axis of the machine, the pool radius is decreased. In contrast, as the weir plate 200 moves radially outward (in response to positioning rod 202 moving to the left) the pool radius increases and the pool height or depth decreases. The counter balance spring will aid in urging the throw out bearing to move to the left, that is, to position the weir plate. Thus, axial movement of the positioning rod will cause axial movement of throw out bearing 208 which in turn will change the location of weir plate 200 and adjust the pool height or depth.

Figure 7C:
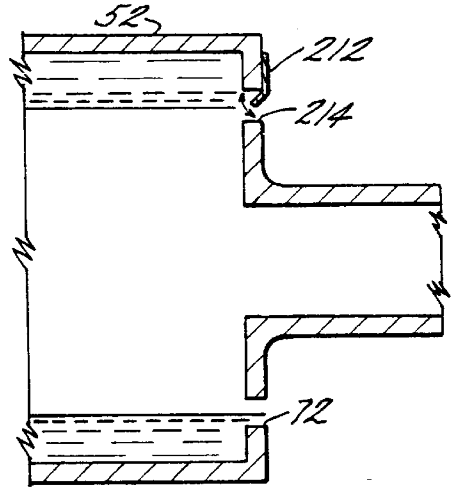
Figure 7D:
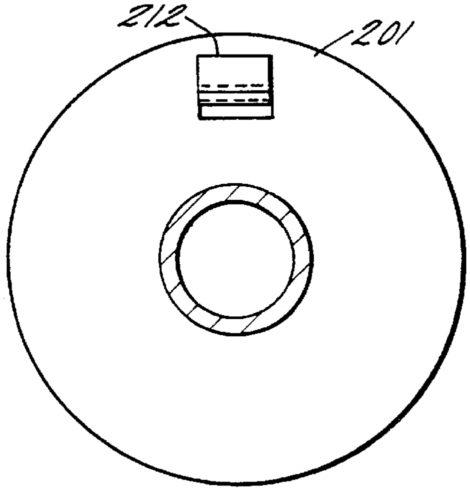

FIGS. 7C–D similarly provide a means for controlling of the radial position of effluent weir 72. In this embodiment, a metal lip 212 is positioned over the effluent opening or port 72. Metal lip 212 is comprised of any known material which undergoes straightening or bending at crease 214 in response to varying temperature. Thus, as metal lip 212 bends inwardly, the distance from the machine axis of rotation to the metal lip increases. This is commonly known as the pool radius. As the pool radius increases, the pool depth or height decreases. In contrast, as lip 212 is straightened, the pool radius decreases and the pool depth increases. The thermal energy to open or close metal lip 212 may be provided by any suitable source including radiant energy or electrical resistance heating. The electrical energy for actuating metal lip 212 may be provided by any suitable connection scheme such as, for example, the connection scheme of FIG. 4F. FIGS. 7C–D thus represent an example of a thermally activated weir plate for controlling the size of effluent port 72.

Figure 7E:
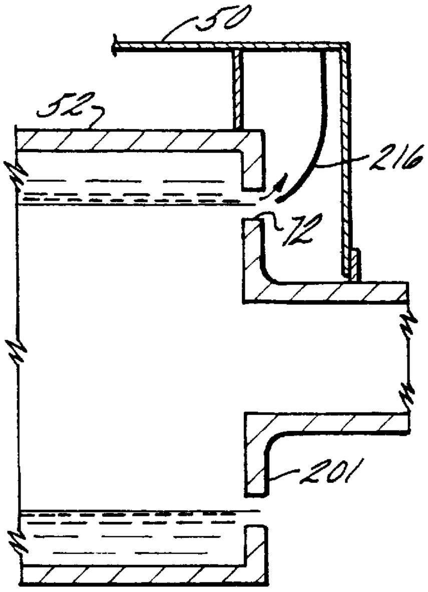
Figure 7F:
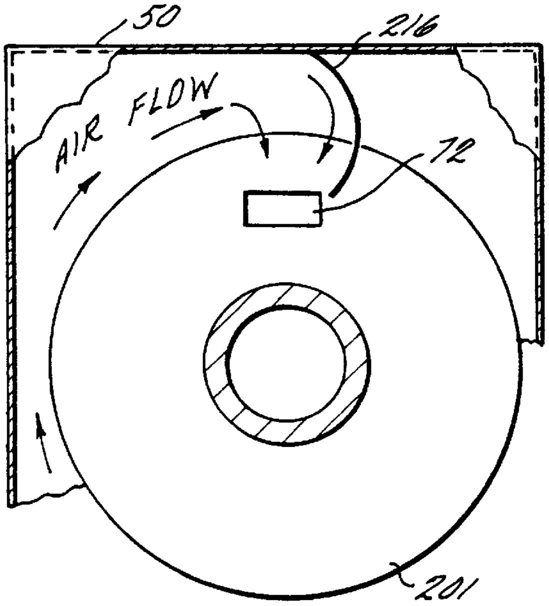

FIGS. 7E–F disclose an air jet restriction system for regulating the height of the pool. In this embodiment, a stationary air scoop 216 is attached to casing 50 so as to discharge in the vicinity of the rotating effluent port 72. As best shown in FIG. 7F, air flow is directed radially about the weir such that it is directed by the air scoop 216 at effluent port 72. The effect is that the air stream will impede liquid flow over the weir. The air stream may be provided by circulating air within the case as shown in FIG. 7F or by some external source.

Figure 7G:
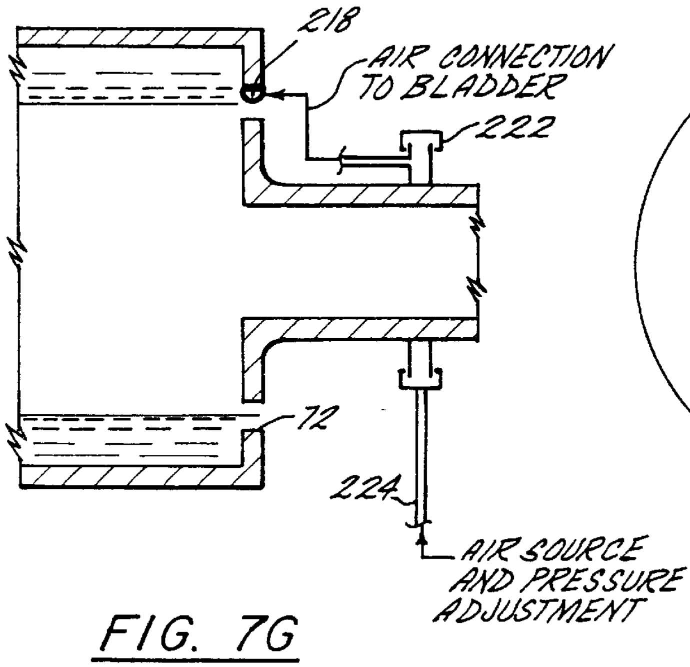
Figure 7H:
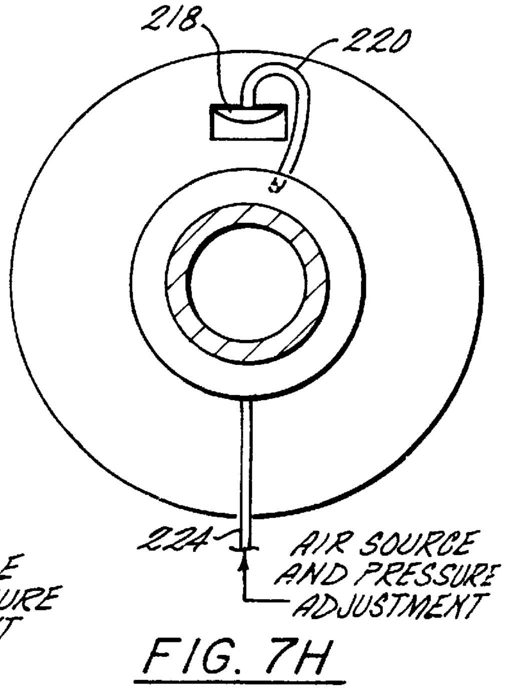

FIGS. 7G–H disclose a pool height adjustment mechanism comprising an inflatable weir. In this embodiment, an inflatable bladder (which may be inflated by air or other suitable fluid) is positioned at a location adjacent effluent port 72. Bladder 218 is connected by a fluid tight conduit 220 to a rotary fluid seal 222 which in turn is connected by another conduit 224 to a suitable pressurized fluid (such as pressurized air). It will be appreciated that as fluid is directed to bladder 218, bladder 218 will be enlarged thereby decreasing the pool radius. Conversely, as fluid is removed from bladder 218, bladder 218 will deflate causing the pool radius to increase. In this way, the pool height can be adjusted in response to signals from the central computer controller 42 which will direct the pressurized fluid valving system to emit fluid to the bladder or to open and remove fluid from bladder.

Figure 7I:
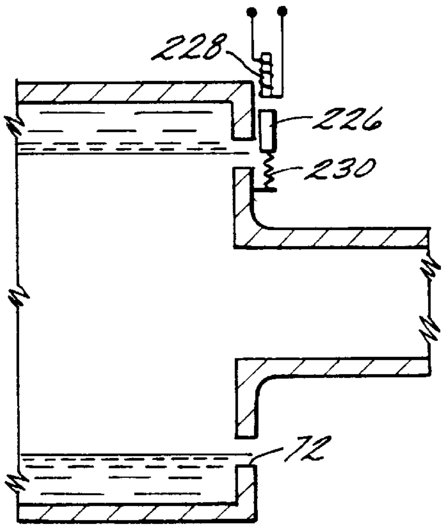
Figure 7J:
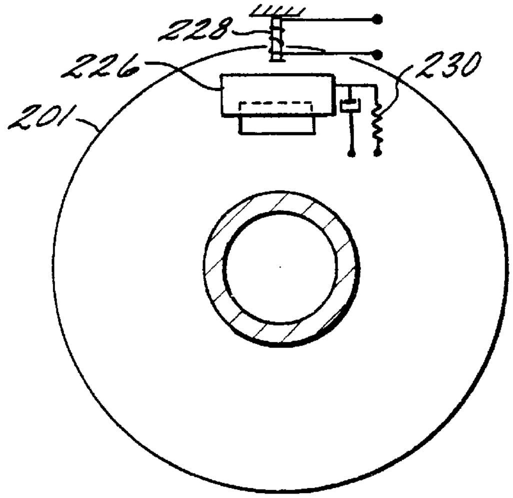

Finally, FIGS. 7I–J disclose an electromagnetic force weir adjustment system for adjusting the pool height. In this embodiment, a movable weir plate 226 similar to the movable weir plate 200 in FIG. 7A is mounted to slidably and radially move along weir plate 201 to thereby increase or decrease the pool radius. Movable weir plate 226 will slide in one or the other direction in response to an adjustable magnetic field emitted by coil 228. A counter G-force spring and damper system 230 is connected to the end of movable weir plate 226 which is opposite to the adjustable magnetic field coil 228. Preferably, the weir plate may be mechanically "tuned" to minimize pulsing effects generated by the intermittent magnetic force on the movable weir plate 226 as a result of rotating past the coil. By positioning the weir plate within this adjustable magnetic field, precise movement of the movable weir plate 226 may be achieved thereby decreasing or increasing the size of the pool radius which in turn will raise or lower the height of the pool.

Figure 7K:
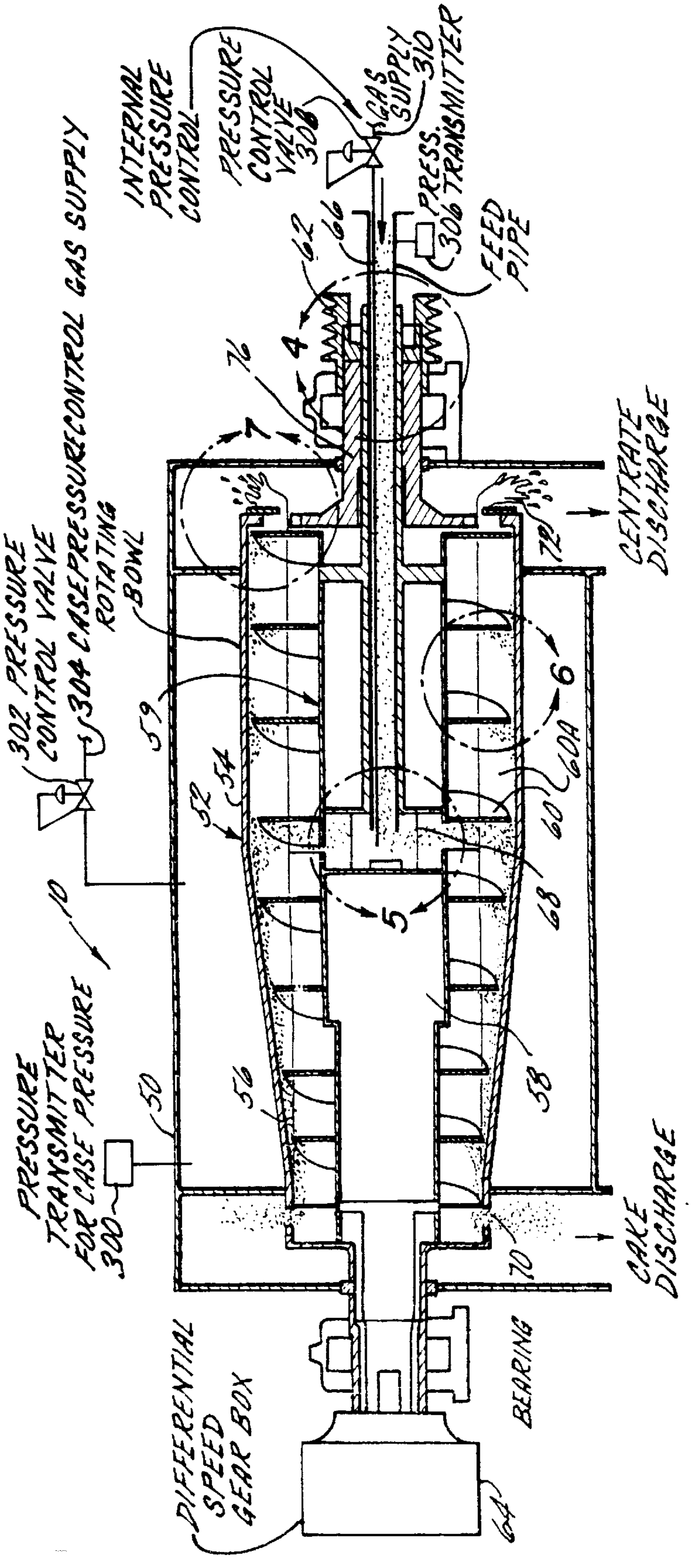
FIG. 7K is a cross-sectional view, similar to FIG. 3, depicting sensing and control systems for controlling internal centrifuge pressure.

FIG. 7K depicts internal pressure sensor and control systems. It will be appreciated that sensing pressure internal of the case 50 will provide a reading of internal bowl pressure since the bowl interior is open at the liquid and solid discharge phase ports. In FIG. 7K, a pressure sensor 300 senses case pressure and a case pressure control valve 302 is connected to a case pressure control gas supply 304. During operation, pressure sensed by sensor 300 is monitored by computer 42. As required, computer 42 in turn can transmit control signals to control valve 302 to raise or lower the pressure within the case 50. Also shown in FIG. 7K, internal pressure may also be controlled by monitoring pressure at the feed pipe 66 using pressure sensor 306 and pressure control valve 308, both of which communicate with computer 42. Preferably, the gas supply 310 supplies the pressurizing gas directly into the feed compartment 68.

External Sensors and Sensor Systems

Figure 3A:
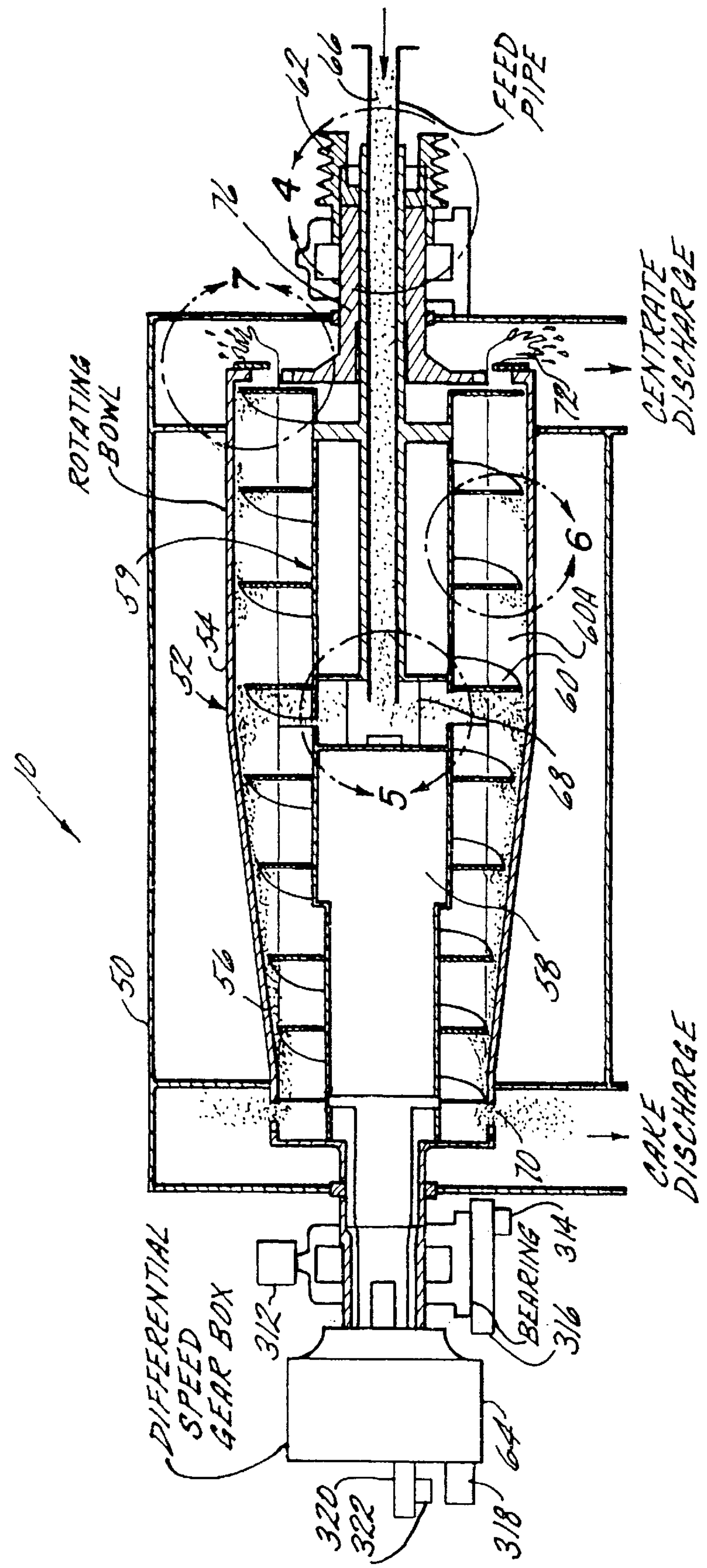
FIGS. 3A–D are cross-sectional elevation views of various external sensors and sensor systems used in the centrifuge monitoring and control system of the present invention.
Figure 3B:
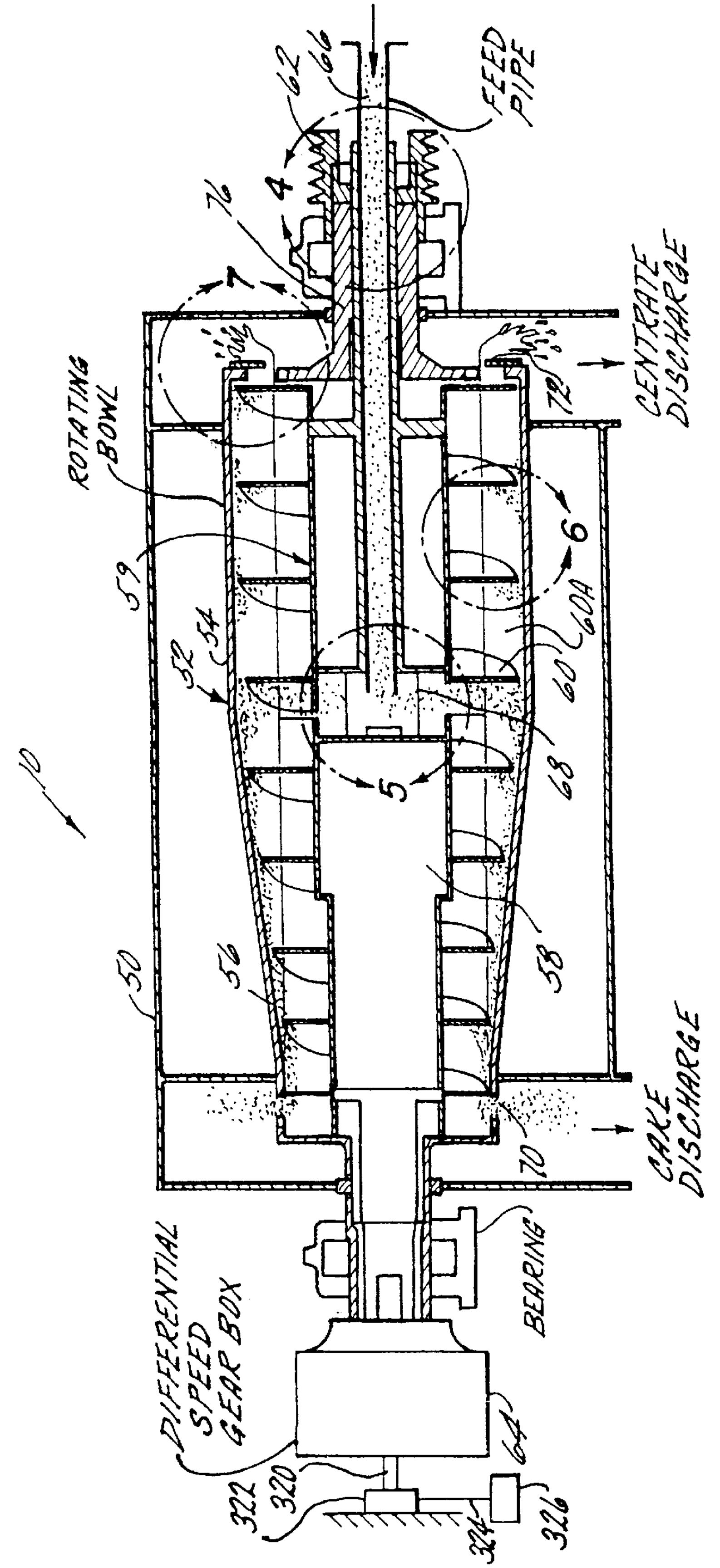
Figure 3C:
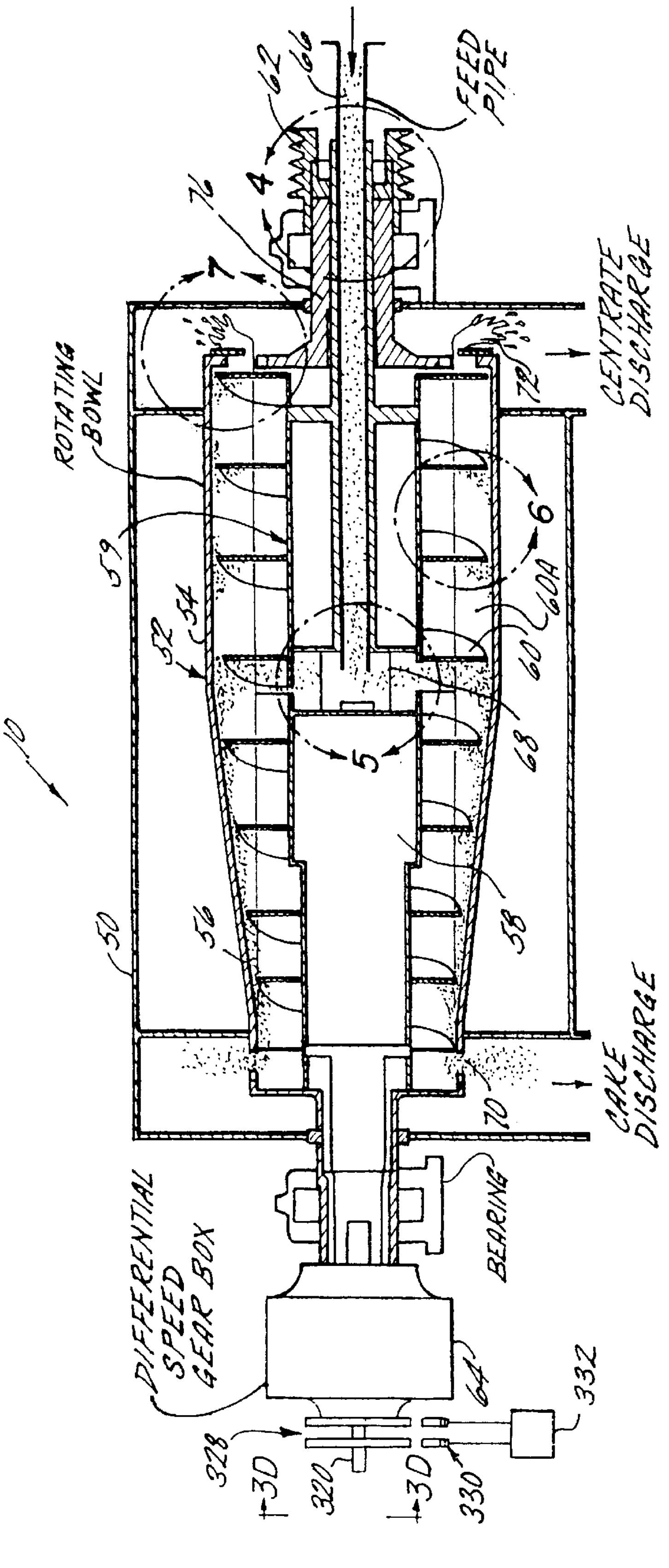

FIGS. 3A–D show respectively external sensors and sensor systems for sensing vibration at the gear box and bearings (FIG. 3A), torque (both AC and DC) (FIG. 3B) and rotational speed of conveyor and bowl (FIG. 3C). Turning now to FIG. 3A, it will be appreciated that vibration may be sensed at the bearings by using a vibration sensor 312 positioned on the upper bearing housing and/or a vibration sensor 314 positioned on the base 316 of the bearing housing. Similarly, vibrations at the gear box may be sensed using a vibration sensor 318 associated with the gear box 64. The vibration sensors 312, 314 and 318 can measure vertical, axial or transverse vibrations. It will be appreciated that vibration measurements on the input pinion shaft 320 are currently used for control checking on conventional centrifuges. While vibration sensors have not been mounted on pinions 320 during plant operation, in accordance with the present invention, a vibration sensor 322 may be mounted to the pinion shaft 320 for use during operation.

In FIG. 3B, sensors for measuring torque are depicted. More particularly, shaft 320 extending from gear box 64 is connected to a torque transducer 322 which communicates by signal wires 324 to a torque transmitter 326. In this case, the input pinion 320 is fixed at the torque transducer 322. If however, the pinion is attached to a hydraulic or electric motor, a break or some other device, then the torque may be measured using the signal derived from the driver. For hydraulic systems, pressure of the hydraulic fluid is proportional to torque and therefor torque may be derived by measuring the hydraulic fluid pressure. Generally, in an electric drive, the current is proportional to the torque and therefore torque is derived using this known mathematical relationship. In some measurements, the chatter or AC torque may be available at the torque transmitter 326.

Figure 3D:

FIGS. 3C–D depict sensors for measuring rotational speed. In this embodiment, a known tooth speed pick up sprocket 328 is mounted on the pinion input shaft 320 to gear box 64 and the gear box casing as shown in FIG. 3C. A speed pick up or proximity sensor 330 sends electrical pulses to a rate calculator 332 using information derived from these sensors. A differential speed and location of speed may be calculated in a known manner.

Other external sensors and sensor systems which may be associated with the control and monitoring system of the present invention include any number of known sensors which sense and measure solids concentration, purity of recovery, mass flow rate, volume flow rate, particle size distribution, cake moisture, constituent analysis and other operating or input/output stream parameters. In one important feature of this invention, sensors are used to sense or monitor parameters in all three streams, namely the input stream, the higher density output stream and the lighter density output stream. Control of the centrifuge is then achieved based, at least in part, on these three sensed parameters. Examples of parameters which may be sensed in all three streams include solids content (such as percent solids), volume flow rate, mass flow rate, particle size distribution, temperature, constituent analysis and polymer addition. Examples of various known sensors which measure many of these parameters are described in Instrument Engineer's Handbook, Volume 1, Bela G. Liptak editor, Chilton Book Company, 1969. Such sensors include microwave sensors, ultraviolet analyzers, chromatograph sensors, infrared analyzers, turbidity analyzers, radiation and other type density sensors, magnetic sensors and like sensors. Moisture and other constituents of the solids and liquid phase discharge may be measured using a microwave moisture meter described in U.S. Pat. No. 5,455,516, all of the contents of which are incorporated herein by reference thereto.

An example of a sensor for providing constituent analysis in any one of the input or output streams is a laser-induced breakdown spectroscopy sensor (LIBS sensor). LIBS sensors are particularly useful in the determination of elemental composition in situ, that is, without the need for removal of a sample for analysis at a separate location. The LIBS sensor allows fast, discrete or continuous, real-time analysis. An LIBS-type sensor suitable for use with the present invention is described in U.S. Pat. No. 5,379,103 to Zigler, the entire contents of which have been incorporated by reference. Such sensors are capable of measuring the percent concentration of one or more elements in a mixture.

External Control Systems and Devices

Control of external operations of the centrifuge present less difficult challenges than the control of internal components such as baffle settings, feed and conveyor position and pool height. For example, based on command signals from the computer controller 42, rotational and differential speed adjustments are easily made to the driving motor or motors. Flow rates, chemical additions solid/liquid concentrations and temperature adjustments are all made by adjusting the feed input in conventional manners.

Historical Data Stored in Memory

The memory/recorder 47 receives operating data pertinent to centrifuge operation from controller 42. This information is used to improve the process performance and maintenance requirements of the centrifuge. At any time, such operating data may be retrieved from a position local to the centrifuge or remotely. The data may be displayed in real time, i.e., while the centrifuge is operating using monitor 44, or as a historical record of some prior operating sequence.

Data logging is an important historical record which can be obtained from the present invention. Data logs may be made on a number of variables. Some of these variables include, bowl speed, differential speed, torque, main drive motor amps and an operator supplied signal for feed flow.

Controller 42 preferably communicates through standard communication cards used on PC equipment. As such, Ethernet, RS-232 and modem capabilities exist for the operator's use. Therefore, the present invention allows the plant to collect centrifuge operating data through a plant wide Ethernet or other network. Additionally, the present invention may communicate to other process devices not supplied by the centrifuge manufacturer. In this way, the operator uses the control and monitoring system of this invention to gather information on a larger portion of the process.

Using a connected plant network, the operator may monitor the centrifuge's real time performance and historical log. Suitable software for this activity includes operator screens for data display, message displays for operating assistance and may include an on-line operation and maintenance manual. The operator may also control and optimize the performance of the centrifuge through the plant network.

Pre-formatted reports may present the retrieved data to show information such as; operating hours, alarms generated, number of starts, number of trips, electrical power used, maximum and minimum values for measured variables, total feed processed, etc. Using the operating data, the centrifuge manufacturer may recommend measures to avoid down time and to optimize run time. Also, maintenance procedures may be suggested based on the operating log of elapsed run time, and unusual operating conditions such as high bearing temperatures or frequent high torque trips.

The operating data log thus helps to trouble shoot various operating conditions of the centrifuge. This enhances the centrifuge manufacturer's ability to solve customer operational problems and to keep equipment on line.

Controller Operation and Processing

Controller 42 may operate and process using any one or more of a plurality of schemes including "feed forward", "feedback", "genetic algorithms" and "expert" systems. Feed forward is where process and machine measurements (or calculated, inferred, modeled variables normally considered ahead of the centrifuge in the process) are used in the controller 42 and or control scheme to effectively control the operation of the centrifuge. Control of the centrifuge encompasses both physical and mechanical aspects and operating ranges dealing with safe operation as well as efficient operation regarding both mechanical and process as well as optimum performance of the operation. Feed forward schemes inherently acknowledge that the conditions and state of the feed material to the centrifuge change over time and that by sensing or calculating these changes before they enter the centrifuge, control schemes can be more effective than otherwise might be possible. Feedback is where measurements and calculated values that indicate process performance and machine state are used by controller 42 and the control scheme contained therein to stabilize the performance and to optimize performance as feed conditions changes and machine performance changes in reference to set points and optimization objectives, process and machine models are embedded in controller 42 as well as methods to evaluate the models to determine the present and future optimum operating conditions for the machine. Optimum conditions are specified by flexible objective functions that are entered into the controller 42 by the operators or plant control system that is dealing with plant-wide control and optimization. The models contained therein are adaptive in that their form or mathematical representation can change as well as the parameters concerned with any given model. These models include, but are not limited to first principles and phenomenological models as well as all classes of empirical models that include neural network representations and other state space approaches. Optimization is accomplished by combining the knowledge contained about the process and machine through these models with expert system rules about the same. These rules embody operational facts and heuristic knowledge about the centrifuge and the process streams being processed. The rule system can embody both crisp and fuzzy representations and combine all feed forward, feedback and model representations of the machine and process to maintain stable, safe operation and also optimal operation including the machine and the process. Determination of the optimum operating states includes evaluating the model representation of the machine and process. This is done by combination of the expert system rules and models in conjunction with the objective functions. Genetic algorithms and other optimization methods are used to evaluate the models to determine the best possible operating conditions at any point in time. These methods are combined in such a way that the combined control approach changes and learns over time and adapts to improve performance with regard to the machine and the process performance. One of the important calculated sensors included in this process is the economic performance of the centrifuge. Economic performance includes base machine operating costs, the normalized performance cost dealing with throughput rates and the quality of the products produced both in absolute terms and terms normalized for feed conditions.

FIG. 2 reflects the "intelligent" controller features including calculation of sensor values, a rule module, a model module and an optimization module.

As discussed above, the adaptive control system of this invention uses one or a combination of internal and/or external machine and/or process variables to characterize or control the performance of the centrifuge, in terms of the desired process outputs. Preferably, the control system continually updates its knowledge of the process, so that its control performance improves over time.

EXAMPLES

While a number of specific examples 1–23 describe various features and advantages of this invention, the following Table provides an overview of certain process variables to be sensed using the aforementioned sensors, control modes and variables which are then controlled by computerized controller 42 for optimizing and/or adjusting the performance of a continuous feed centrifuge.

TABLE 1

| Process Variable to be Sensed or Calculated | Control Mode | Controlled Variable |
|---|---|---|
| Feed Solids | Feed Forward | Differential, Feed Flow Polymer Flow |
| Cake Solids | Feedback | Bowl speed, Differential, Feed Flow, Polymer Flow, Pool Height, Baffle Clearance |
| Effluent Solids | Feedback | Bowl Speed, Differential, Feed Flow, Polymer Flow, Pool Height |
| Pool Height in Machine | Feedback | Feed Flow, Pool Height |
| Settled Sludge Blanket in Machine | Feedback | Differential, Feed Flow, Polymer Flow |
| Differential Speed | Feedback | Pinion/Converter Speed |
| Bowl Speed | Feedback | Bowl Speed |
| Backdrive Torque | Feedback | Bowl Speed, Differential, Feed Flow, Polymer Flow, Pool Height |
| Cake Rate (Mass or Vol) | Feedback | Bowl Speed, Differential, Feed Flow, Polymer Flow, Pool Height, Baffle Clearance |
| Effluent Rate (Mass or Vol) | Feedback | Feed Flow |
| Feed Rate (Mass or Vol) | Various | Differential, Feed Flow, Polymer Flow, Pool Height |
| Cake Baffle Clearance | Feedback | Baffle Clearance |
| Rheological Properties of Sludge | Various | Bowl Speed, Differential, Feed Flow, Polymer Flow |

The following non-limiting examples depict several specific parameters which may be sensed and controlled by the computerized control system of the present invention.

Example 1

Figure 8:
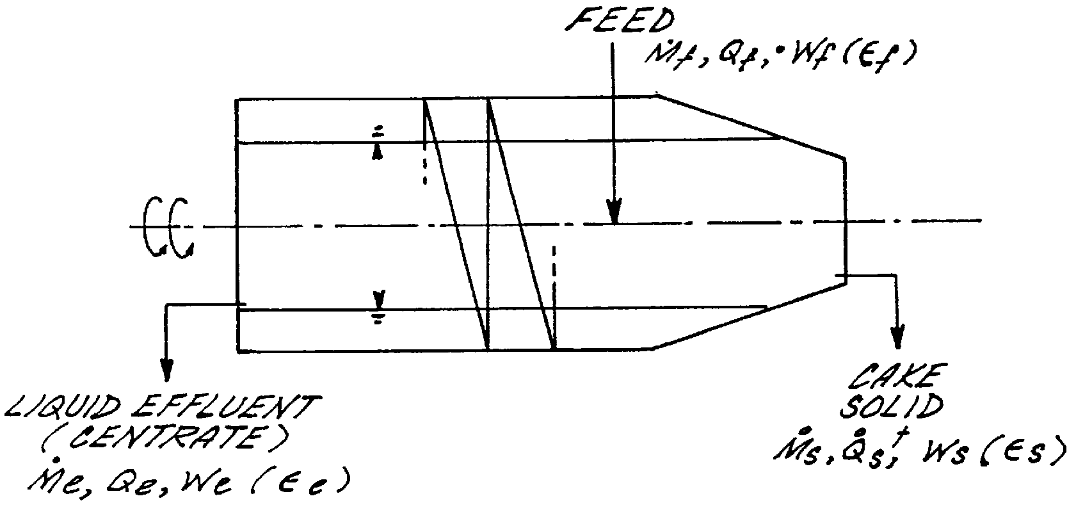
FIGS. 8–30 are schematic and diagrammatic views depicting various examples of centrifuge operation and the control and monitoring method and apparatus of the present invention.

FIG. 8 is a schematic view of a continuous feed solid bowl (FIG. 1A) centrifuge depicting the feed stream, liquid effluent or centrate stream and solid (cake) stream. A steady state mathematical description of the three input/output streams is as follows:

Solid Balance:

$$M_f W_f = M_e W_e + M_s W_s$$

Solid and Liquid Balance:

$$M_f = M_e + M_s$$

where $M_i$ = mass rate of bulk slurry (solid and liquid for stream "$i$")

$W_i$ = weight fraction of solids for stream "$i$"

$i = f$ (feed)

$e$ = (liquids centrate)

$s$ = (cake)

Referring to FIG. 8 and in accordance with this invention, the mass rate M and/or volumetric flow rate $Q_i$ of the liquid and solid phase input/output stream "i" may be measured in real time using an appropriate measurement device as described above. These measurements are then used to adjust the mass rate and/or flow rate of the input stream so as to optimize centrifuge operation. An alternative to using weight fraction $W_i$ is to use volume fraction of solids $\epsilon_i$ as shown in brackets in FIG. 8 in conjunction with volumetric flow rate $Q_i$ in place of mass rate $M_i$.

Example 2

Figure 9:
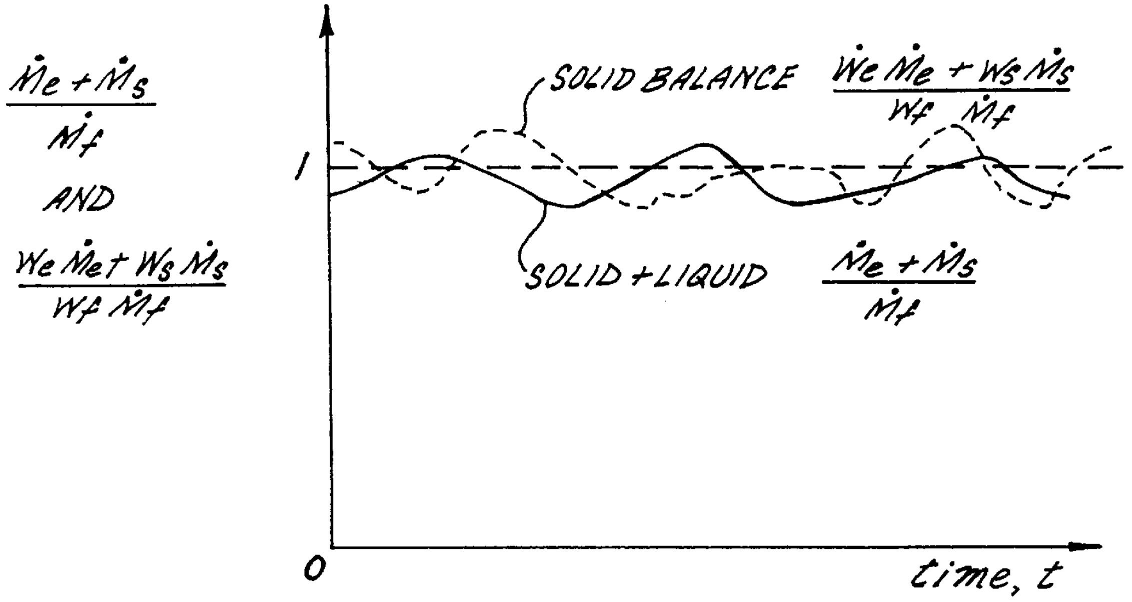

Referring to FIG. 9, a plot of material balance indices with time is shown. Variation of such material balance indices with time provides an indication of the state and steadiness of the separation process within the centrifuge. Thus, in accordance with the present invention, the mass rate for the solid and liquid phase output and feed is measured in real time using appropriate external sensors as is the weight percent of solids $W_i$ in these three streams. This information is sent to the computerized controller where a steady state check is made over a time period such as illustrated by FIG. 9, and the control computer can then signal the various measuring sensors as to the state the machine is operating at (steady versus transient), and whether control of the machine should be taken place accordingly.

A preferred processing technique involves the following:

Feed $$M_f = \rho_f Q_f$$

$$(M_f)_{db} = M_f W_f$$

where $M_f$ = mass rate of feed slurry $(M_f)_{db}$ = mass rate of dry feed solids $Q_f$ = volume rate as measured by flow meter $W_f$ = weight % solids as measured using on-line techniques $\rho_f$ = slurry density Effluent $$M_e = \rho_e Q_e$$

$$(M_e)_{db} = M_e W_e$$

where $\rho_e$ $Q_e$ and $W_e$ are determined in the same manner as the feed measurements.

| Cake |
| --- |
| $M_S$ is measured by transducer/load cell installed at cake hopper<br>$W_S$ solids content inferred from measured cake rheological properties<br>$Q_S$ only measurable if cake is flowable like a fluid. |

Example 3

Figure 10A:
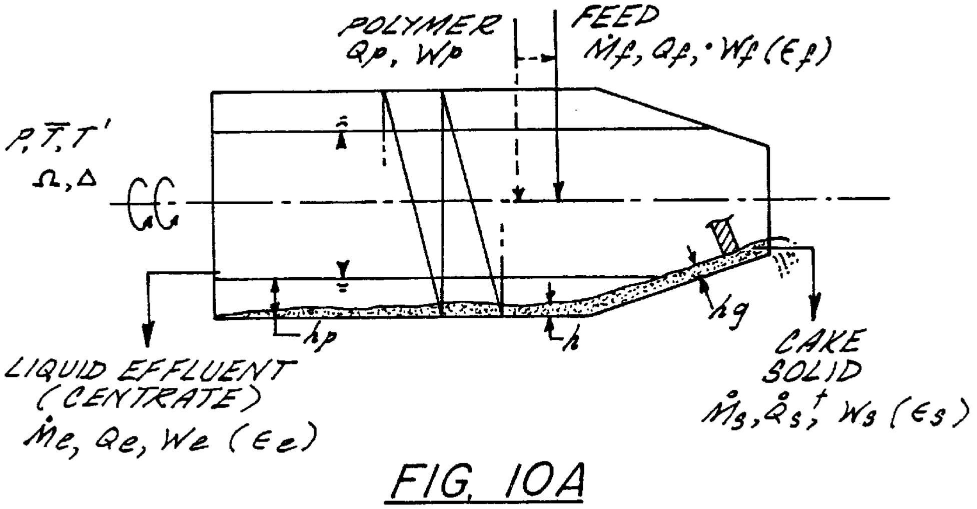

FIG. 10A is a schematic of a solid bowl centrifuge of the type disclosed in aforementioned U.S. application Ser. No. 08/468,205, now U.S. Pat. No. 5,643,169, which has been incorporated herein by reference. It will be appreciated that in accordance with this invention, many of the operating variables and parameters in FIGS. 10A and 10B may be measured using various external sensors and may thereafter be controlled in order to optimize operation. Such operating parameters include polymer dosage D, pool depth $h_p$, cake height h, gap of beach control structure or cake baffle $h_g$, angular speed Ω, dc and ac torque (T and T') and power input P. Temperature can be a particularly important parameter for measurement and control as temperature effects viscosity, surface tension and wetting angle of the liquid phase.

Example 4

Figure 10B:
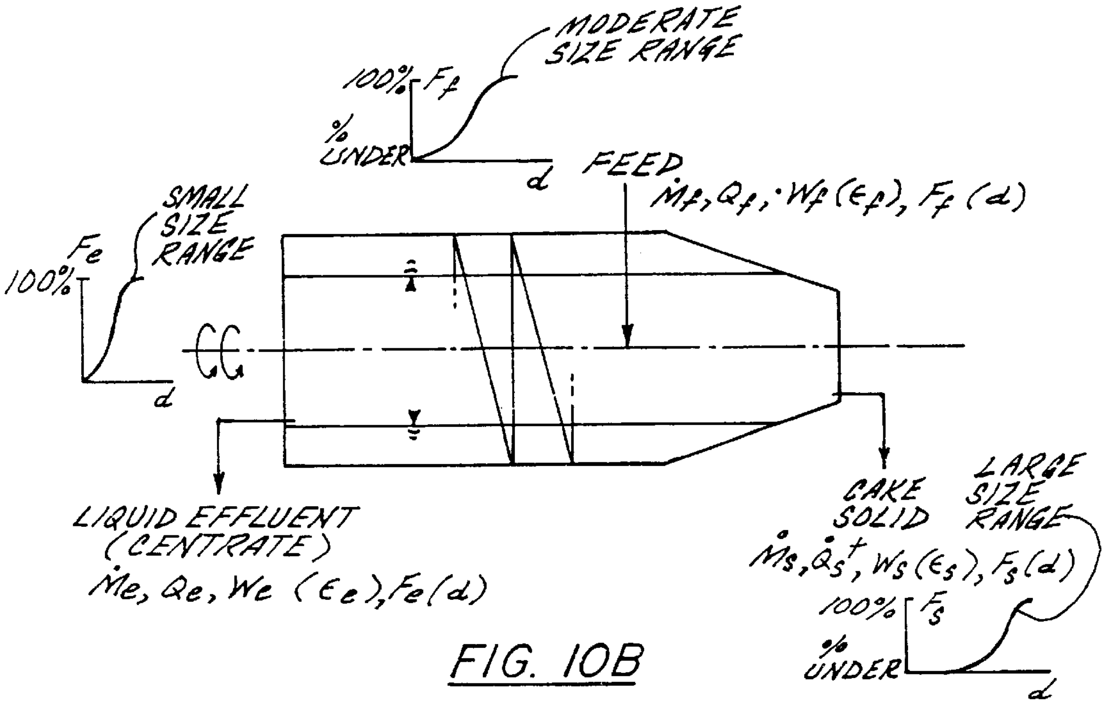

FIG. 10B depicts the operating parameters and graphical relationship for classifying particle size distribution, measured by % cumulative under a given size, or F(d) for the feed, liquid effluent and cake solids. In accordance with the present invention, the variables shown in FIG. 10B are sensed or measured in real time, and input to the computerized control to determine particle size distribution and improve so-called clarification of the effluent liquid stream. In particularly difficult solids where particle size distribution is not well defined such as waste, sewage and general biological sludge, improved clarification is achieved through the computer control of one or more variables such as polymer dosage, bowl angular rotation speed, differential speed or pool height.

In a different application on classification (such as for coating) where the liquid effluent is product containing fine particles between 0.5 to 2 microns, the machine is tuned to operate such that 90–95% of the particles is less than a prescribed size (1–2 microns). The oversize particles greater than 2 microns settle in the machine as rejected cake. The undersize particles less than 0.5 micron are separated out as slime downstream.

Example 5

Figure 11:
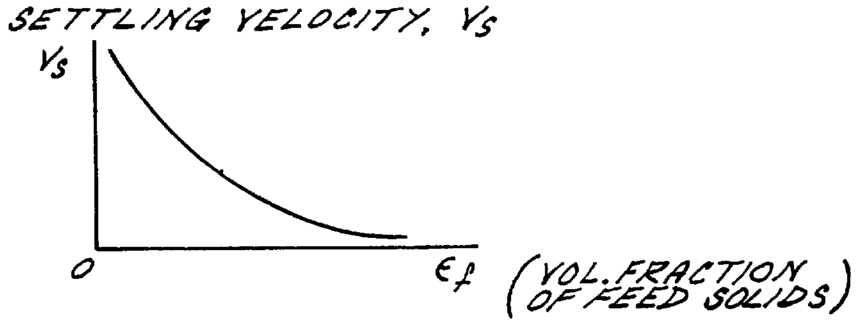
Figure 12:
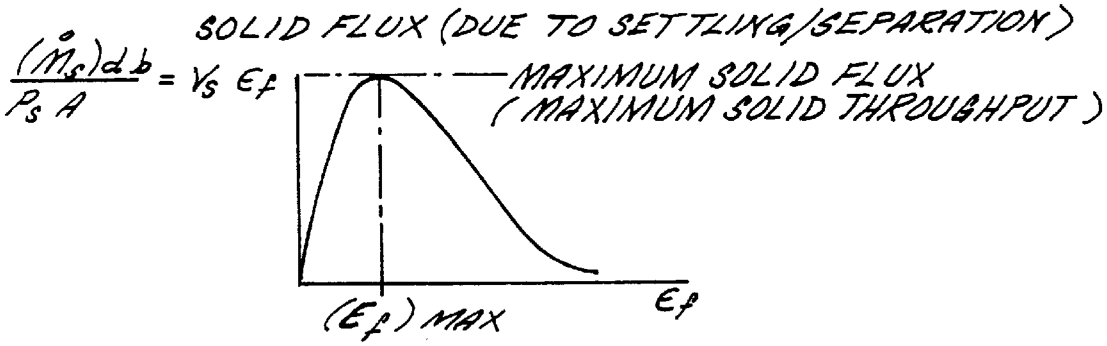

Referring to FIGS. 11 and 12, the present invention may be used to control feed dilution (fine particles where polymer addition is not practical). Settling of a particle can be interfered with by the presence of neighboring particles' flow fields. At "high" solids concentration, the solids within the slurry settle at the same velocity (hindered settling) independent of size and depends only on concentration. As shown in FIG. 11, in accordance with the present invention, measurement and control of volume fraction of feed solids using the computerized control system of this invention can achieve optimization.

Example 6

FIG. 12 is a graph describing optimization of solids separation through the centrifuge.

$$(M_s)_{db} = \rho_s \epsilon_f Q_f = \rho_s \epsilon_f V_s A_{settle}$$

$$A_{settle} = 2\pi R_{pool} L$$

$$(M_s)_{db} / \rho_s A_{settle} = \epsilon_f V_s = \text{function } (\epsilon_f)$$

$R_{pool}$ = pool surface radius $V_s$ = length of clarifier where $\rho_s$ = solid density $\rho_L$ = liquid density $W_f$ = weight fraction of solid $\epsilon_f$ = volume fraction of solid Thus, with reference to FIG. 12, by measuring $\rho_s$, $\rho_L$, $W_f$, and thus inferring $\epsilon_f$, the computer controller can determine $(\epsilon_f)$ max, which gives the maximum flux, and thereby optimizes solids throughput.

Example 7

Figure 13:
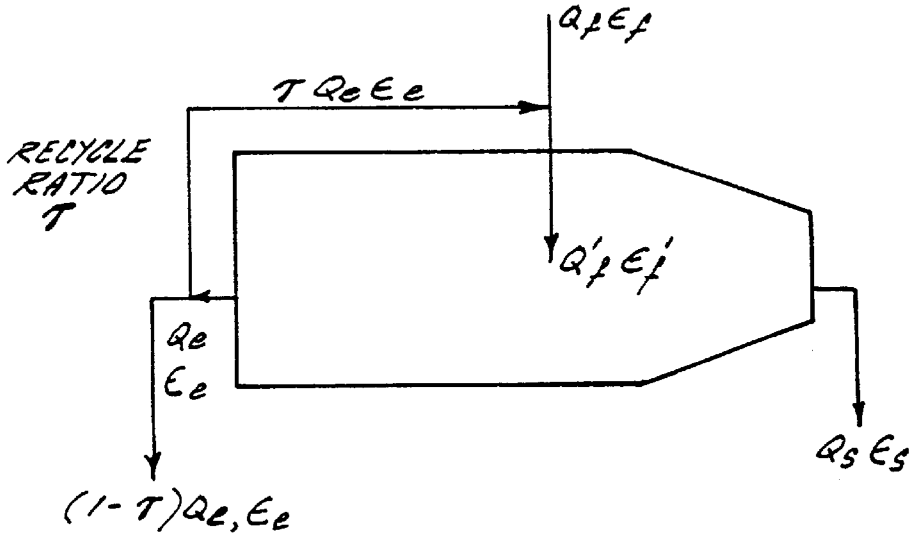

FIG. 13 depicts control of feed dilution using recycled centrate (liquid phase discharge).

In accordance with this invention, real time measurements are made of $Q_e$, $\epsilon_e$, γ, $Q_f$, $\epsilon_f$, $Q'_f$, $\epsilon'_f$ and $\epsilon_s$. Based on these measurements the computerized controller will alter (e.g., increase or decrease) the recycle ratio $\gamma$ in an effort, for example, to obtain cleaner effluent or better solids recovery by manipulating the operating point on the solid flux curve.

Example 8

Figure 14A:
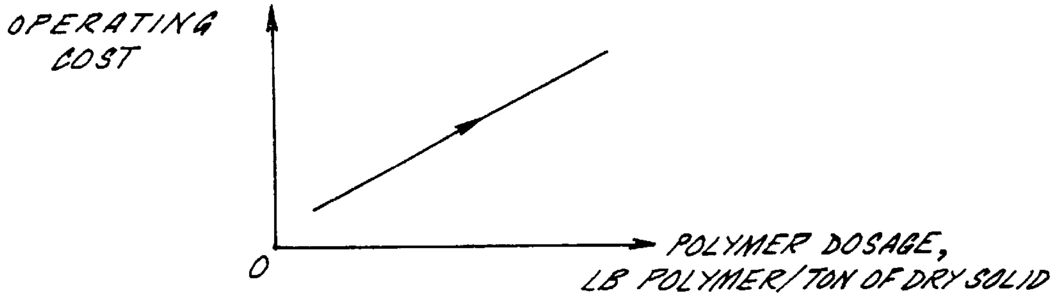
Figure 14B:
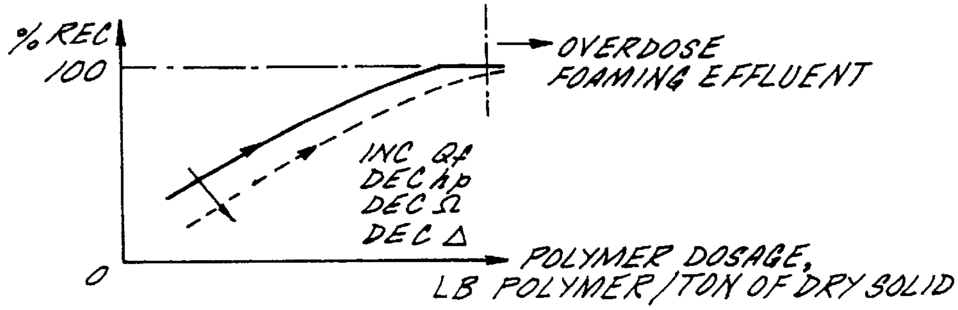
Figure 14C:
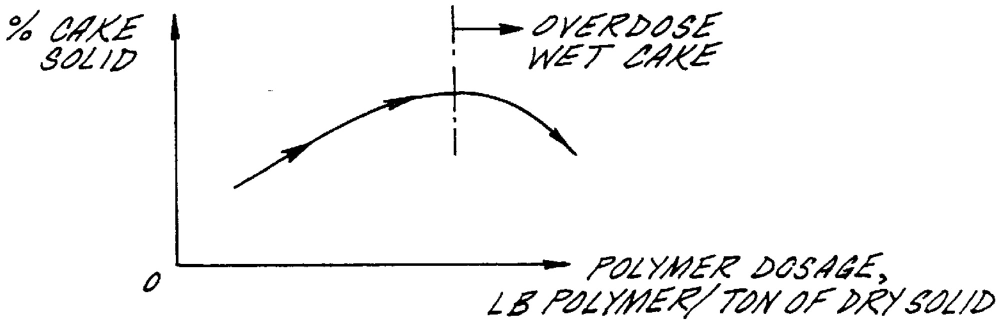

Polymer dosing is used to control difficult-to-settle slurries including biological slurries with low density differences and fme particles. FIGS. 14A–C show the graphical constraints for optimizing polymer dosing. In accordance with the present invention, the effluent solid concentration $W_e$ and cake solid concentration $W_s$ are sensed. This information is then used by the controller to control the dosing by increasing or decreasing the polymer volumetric flow rate and/or polymer concentration.

Example 9

Figure 15:
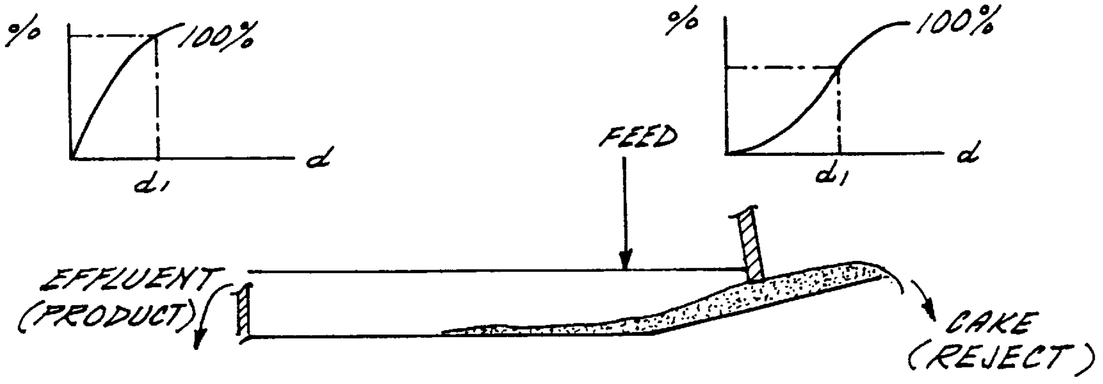

FIG. 15 depicts a cake baffle of the type disclosed in the aforementioned U.S. application Ser. No. 08/468,205 now U.S. Pat. No. 5,643,169. The cake baffle functions to preclude fine solids from being removed with the cake and also assists in the conveyance of the cake by buoyance force as the pool is set at a level close to the spill of the conical beach. By measurement of the conveyance torque (at the pinion) and judging the stability of operation (pool does not spill over at the conical/beach end), this information may be used by the computerized control system to control the opening of the cake baffle and thereby optimize the classification of solid particle size in the cake with respect to quality and throughput. Variation in rheological properties of the cake (watery versus granular, non-Newtonian behavior such as shear thickening versus shear thinning) can thus be accommodated.

Example 10

Figure 16:
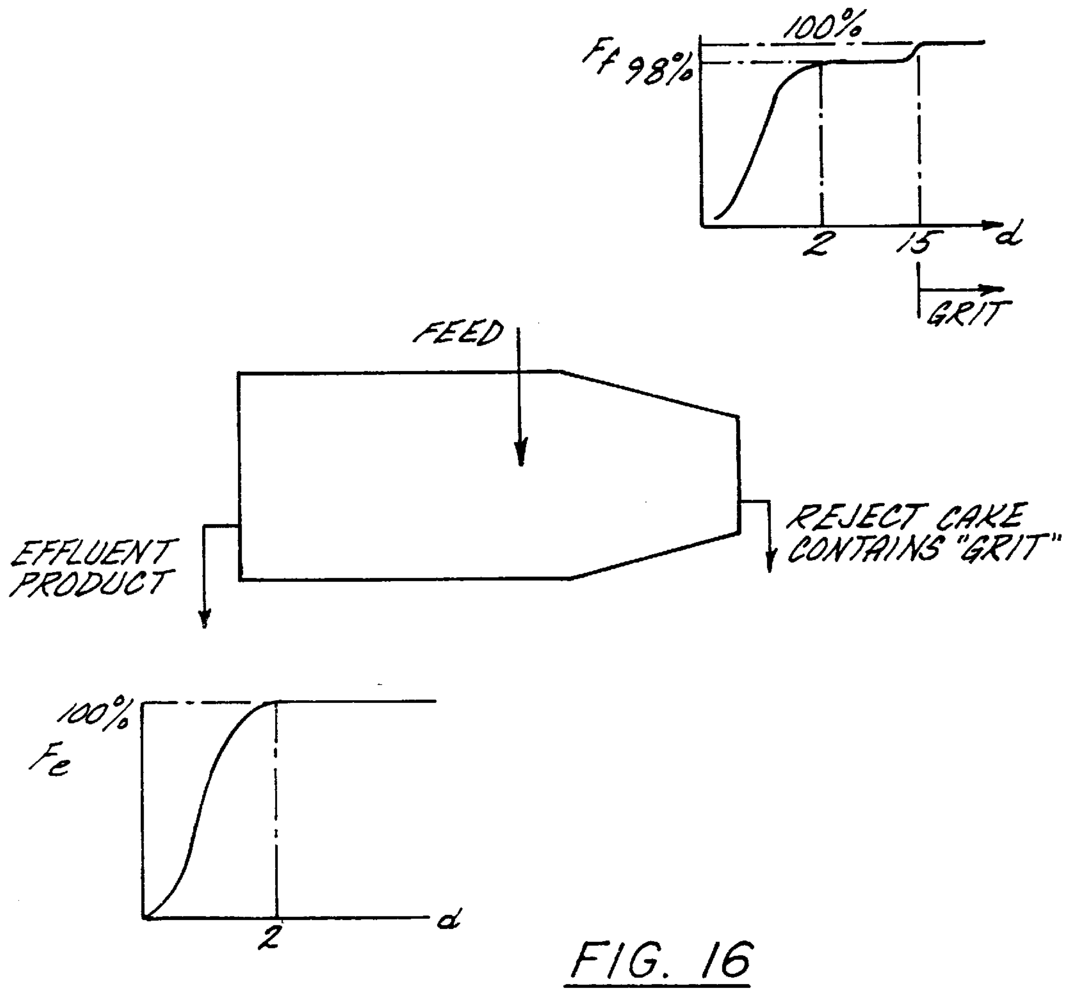

FIG. 16 graphically depicts process controls for controlling (e.g., removing) foreign or oversized particles (grit-particles above 15 microns as shown in FIG. 16) in order to produce a purified, fine slurry. By measurement of grit level in the effluent product, this information may be used by the computerized control system to control the rate and rotational speed of the centrifuge and thereby increase the purity of the fine product slurry.

Example 11

Figure 17:
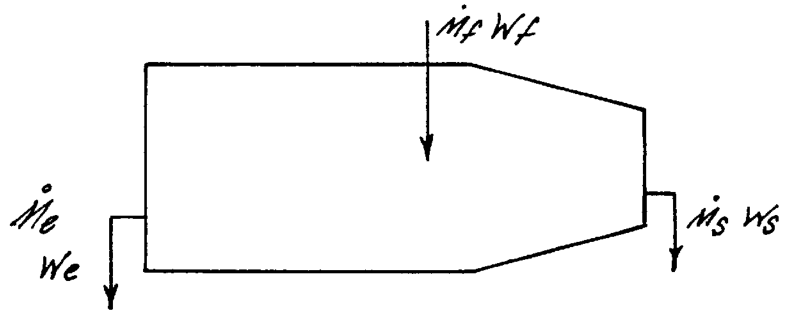

Thickening of fluid streams can be important in waste treatment and food processing. Thickening is used to remove bulk liquid and prepare for final dewatering, and recover valuable liquid from slurry and concentrating feed streams. Referring to FIG. 17, % Recovery of Solid$=M_s\ W_s/M_f W_f \cong 1.0$ Concentrating factor, $CF=W_s/W_f=M_f/M_s$ By measurement of thickened cake solids, this information may be used by the computerized control system to control the rate, rotational speed, differential speed and polymer dosage (if it is used in the application) and thereby concentrate or thicken the solid phase output stream (cake).

Example 12

Figure 18A:
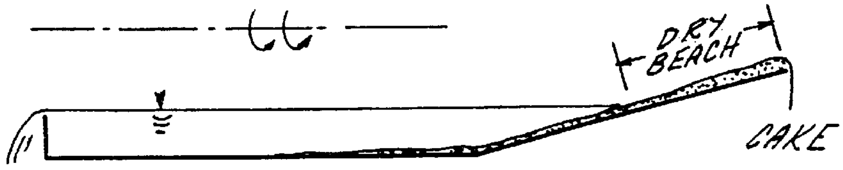
Figure 18B:
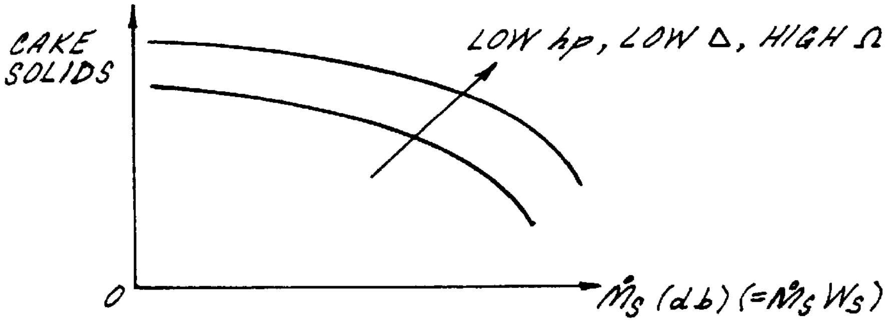
Figure 18C:
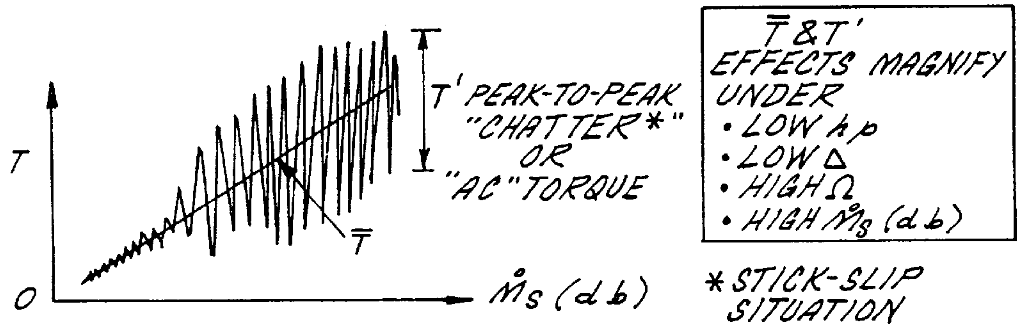

Dewatering involves cake compaction and liquid drainage. Solids compact readily to form cake under (1) long retention time at dry beach with low pool (FIG. 18A); (2) long retention time at dry beach with low differential speed (FIG. 18B); and (3) under high G-force at high rotation speed (FIG. 18C). FIGS. 18A–C thus depict various parameters which may be sensed with the resultant measurements used by the computerized controller to control the degree of liquid drainage from cake (e.g., dewatering). In FIG. 18A, cake solids are sensed and measured; and this information is used by the control system of this invention to control pool setting, rotational speed and differential speed. In FIG. 18B cake solids are sensed and measured; and this information is used by the control system of this invention to control the feed rate. Similarly, in FIG. 18C, torque (mean and fluctuating components) are sensed and measured and this information is used by the control system of this invention to control feed rate, pool setting, rotational speed and differential speed.

Example 13

Figure 19:
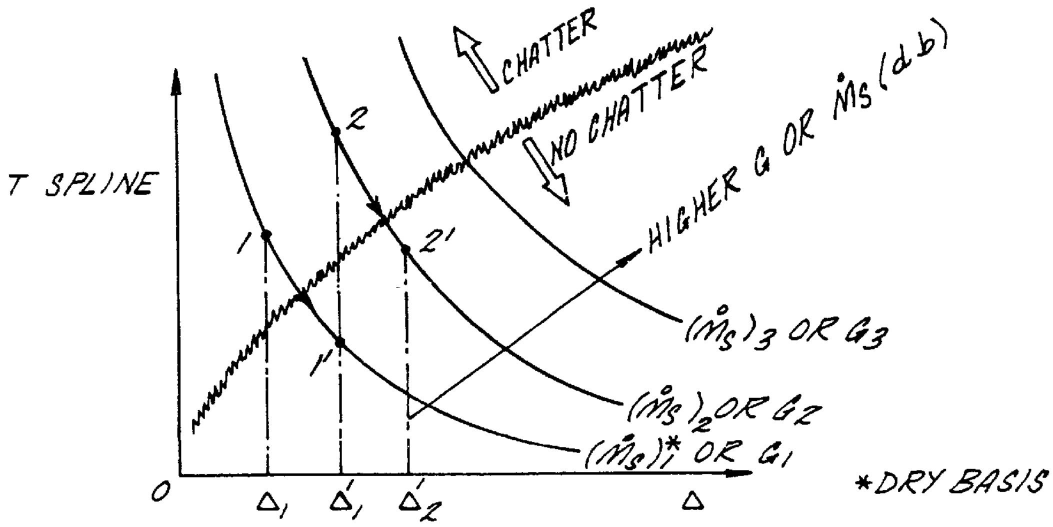

In addition to the ac or chatter (fluctuating component) torque shown in FIG. 18C, the mean conveyance torque can also be measured and that information either alone, or combined with the chatter torque may be used to control the centrifuge. Turning to FIG. 19, a graphical illustration is shown of the combined effects of chatter torque and conveyance torque. In accordance with this invention, by monitoring and sensing both torque components and differential speed, this information may be used by the computerized control system to control differential speed, feed rate, G-force, (rotational speed) and thereby optimize machine performance.

Example 14

Figure 20:
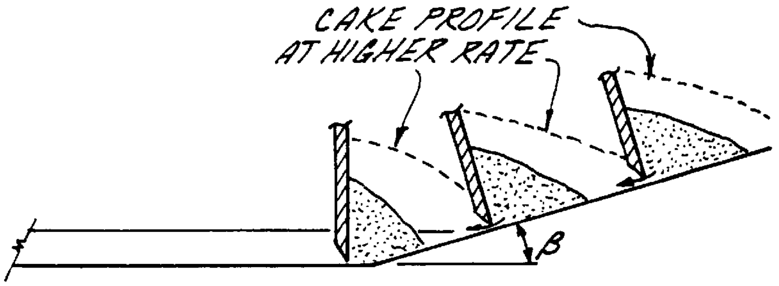
Figure 21:
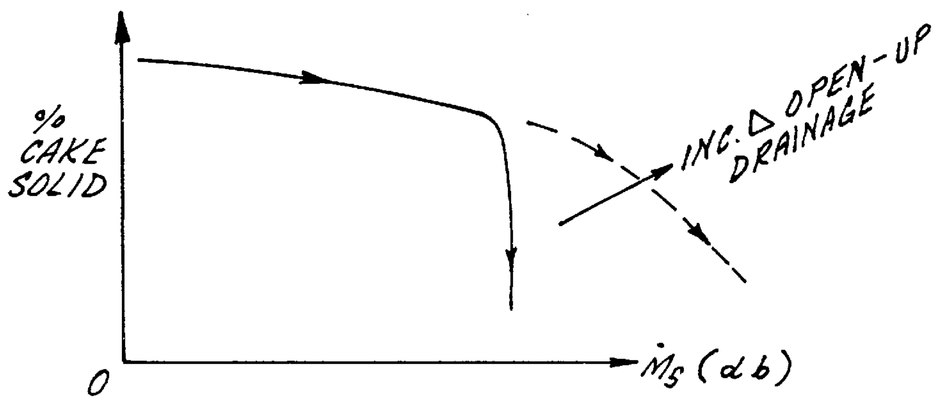

In FIG. 20, the liquid drainage path is blocked at higher rates as cake wets adjacent blades. At lower rates, the cake does not fully wet the helix channel and the drainage path for expressed liquid is fully open. The net effect is shown in the so-called hockey-stick profile of FIG. 21. It is typical for non-compactible but drainable cake with granular structure. Based on the foregoing, cake moisture (or dryness) can be controlled by measuring cake moisture external and in-situ and cake profile in-situ and in response to the resultant information, controlling differential speed to open up the drainage.

Example 15

Figure 22:
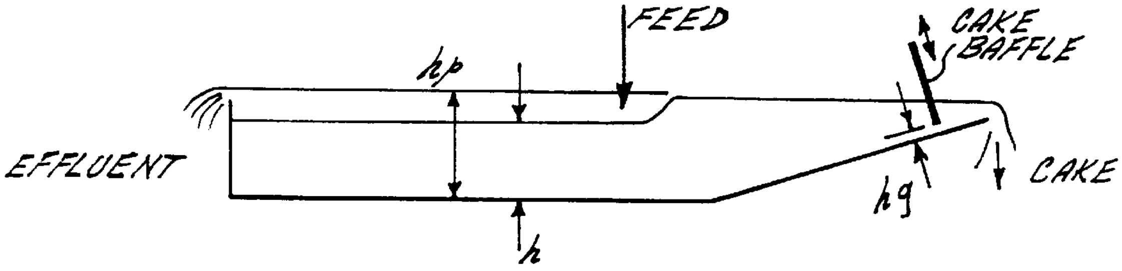

Dewatering of compactible, non-drainable, fully saturated cake may be controlled and/or optimized by (1) sensing and controlling pool height, (2) sensing and controlling cake baffle opening $h_g$, (3) sensing and controlling G, (4) sensing and controlling cake height, (5) sensing and controlling feed rate and feed solids, (6) sensing and controlling polymer dosing, (7) sensing and controlling cake solids, and (8) sensing and controlling effluent solids. FIG. 22 depicts an application of the foregoing for biological sludge (e.g., sewage). By controlling these parameters, the machine can be operated under suitable conditions despite the deep cake blanket and minimal pool volume for clarification.

Example 16

Figure 23:
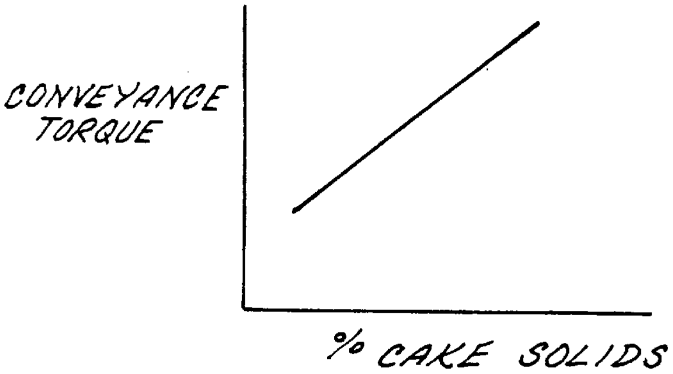

FIG. 23 shows the relationship between average torque as measured as a function of % cake solids for compactible cake. Thus, average torque may be measured and this information is an indication of the cake depth inside the bowl. It may then be used by the computerized control system of this invention to control and/or optimize % cake solids.

Example 17

Figure 24A:
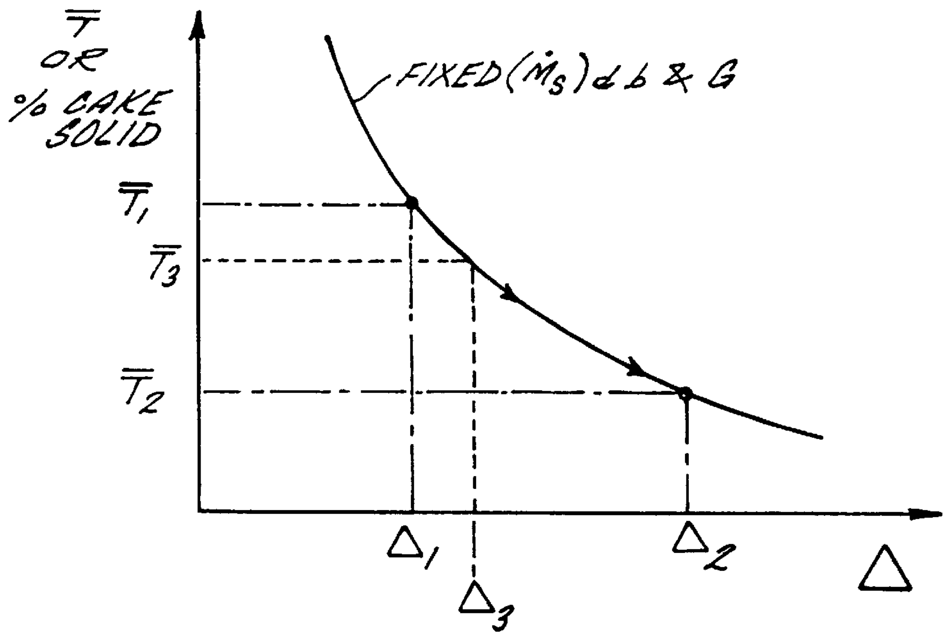
Figure 24B:
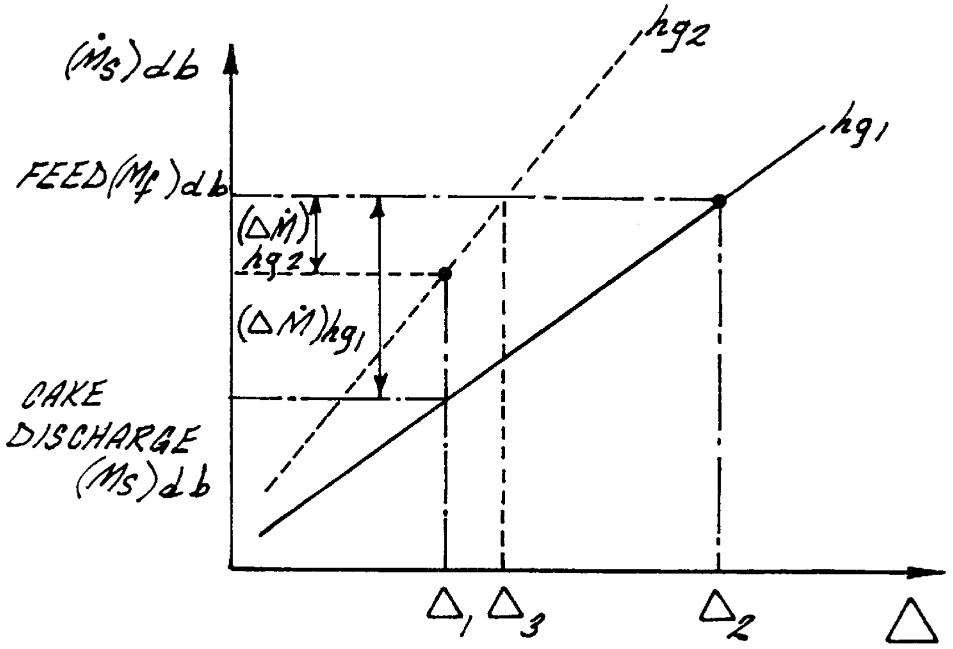

FIG. 24A depicts the inverse relationship between (mean) conveyance torque and differential speed in a solid bowl centrifuge. FIG. 24B depicts the relationship between mass rate of the feed and cake solid, differential speed and baffle opening in solid bowl centrifuge. Based on FIGS. 24A–B, in accordance with the present invention, by sensing torque, (an indication of cake solids) and effluent, this information may be used to control the baffle opening and differential speed so as to control the operation of a solid bowl centrifuge, otherwise cake solids or effluent quality is compromised.

Example 18

Figure 25:
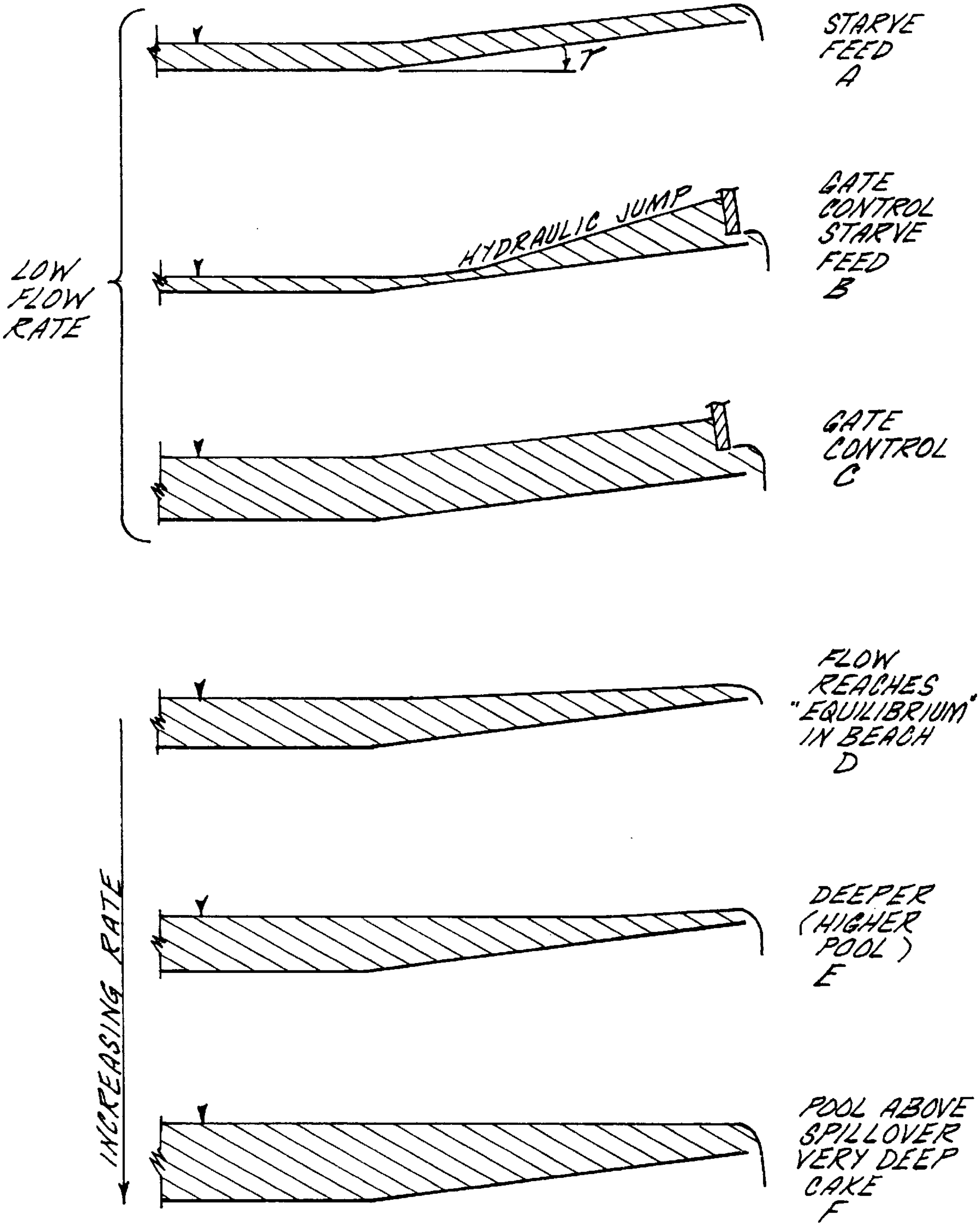

Cake height distribution in a solid bowl centrifuge provides information on (1) cake dryness within the centrifuge and discharged cake, (2) torque, (3) conveyance, (4) solids content in centrate, (5) utilization of centrifuge volume/space for clarification, compaction and dewatering and (5) potential problems related to solids conveyance. Thus, in accordance with the present invention, by sensing cake height, the computer system of this invention may control feed rate, rotational speed, differential speed, and pool and cake baffle opening (when present). The ability of the cake to flow is dependent upon these aforementioned variables. Referring to FIG. 25, various scenarios are shown for increasing feed rates and controlling the cake baffle or exit gate opening in response to cake height sensing, all of which have a predetermined effect on cake flow.

Example 19

Figure 26:
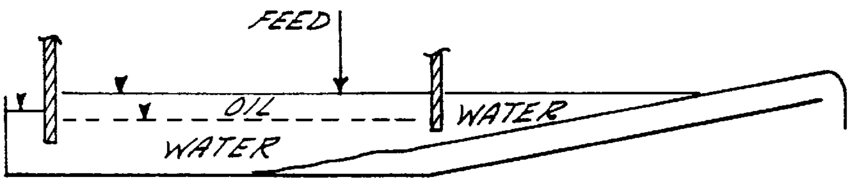
Figure 27:
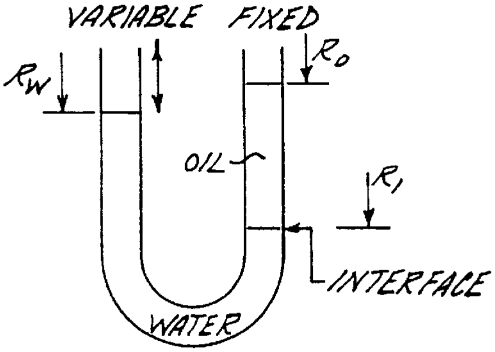

Pool depth and interface (liquid-liquid, liquid-solid cake) measurements affect the (1) torque, (2) cake dryness, (3) centrate quality and (4) 3-phase separation characteristics. For example, FIG. 26 depicts a 3-phase oil/water/solid slurry where the water is to be separated from the oil. The relationship between the three phases is depicted in FIG. 27 where Rw=water discharge radius, Ro=oil discharge radius and Ri=oil-water interface radius. In accordance with this invention, the various interfaces and associated depths are sensed and this information is used by the computerized control system as follows:

| Control Variable | Result |
|---|---|
| Reduce Rw | Thicker water layer and therefore cleaner water discharge, discharged oil may contain water |
| Increase Rw | Thicker oil layer and therefore water discharge may contain oil |
| Optimize Rw | Best oil/water separation |

Figure 26A:
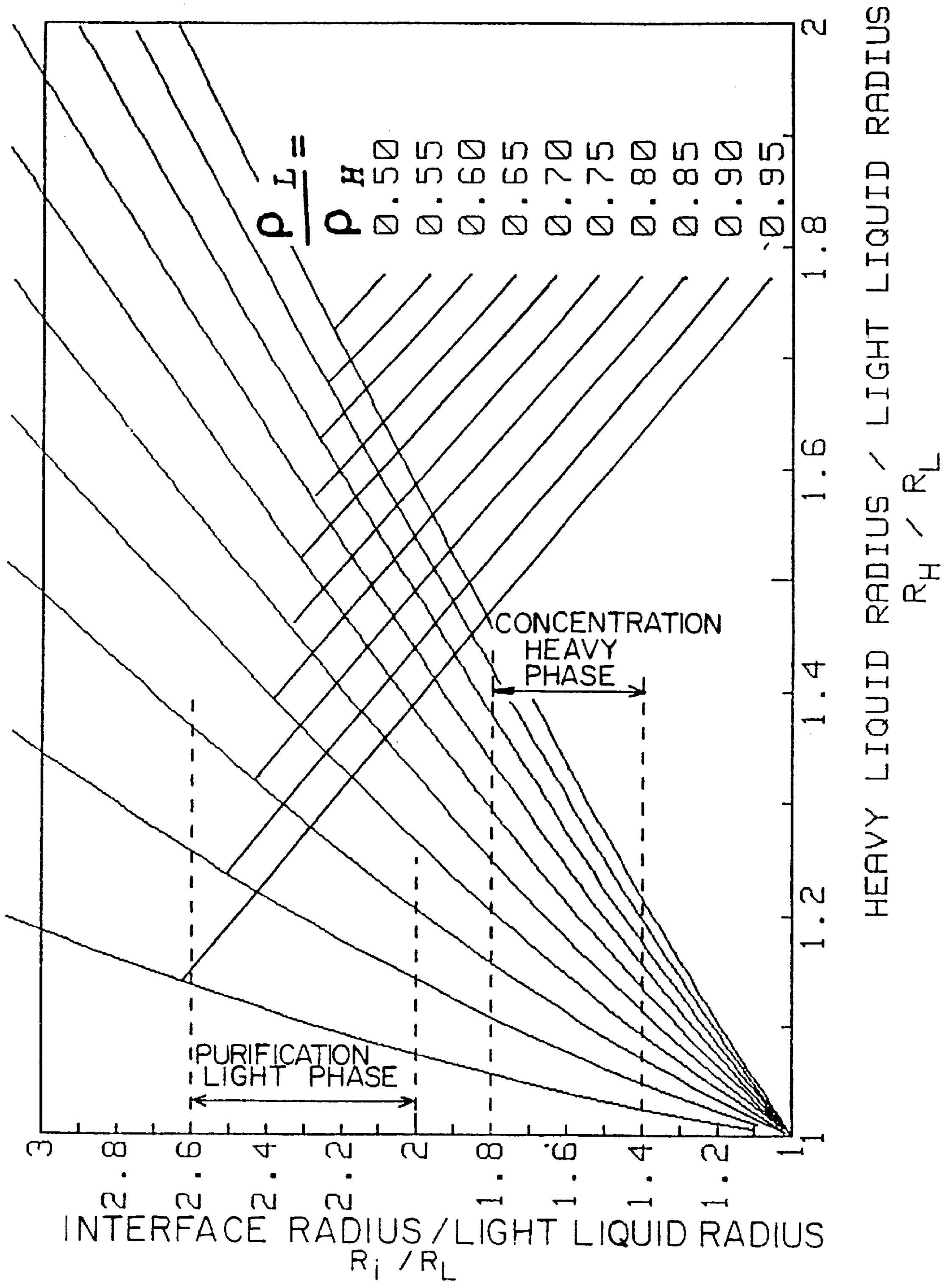

For other liquids, oil in the above refers to a lighter liquid and water a heavier liquid. FIG. 26A provides a working chart to determine the position of the interface radius once the radii of discharge of both the heavy and light phase are prescribed and the densities are known. By controlling the discharge radii of the light and heavy phases, the degree of purification of the light phase or the degree of concentrating the heavy phase can be controlled.

Example 20

Figure 28:
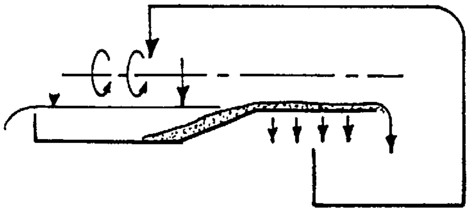

This example relates specifically to dewatering processes using continuous feed screen bowl centrifuges. Referring to FIG. 28, filtrate solids may be controlled using recycle of a controlled amount of such solids back to the feed stream. This is accomplished by measuring the filtrate solids and using that information to control the degree of recycling. Also, in a screen bowl centrifuge, the pool should be maintained close to the junction between the beach and cylinder to avoid an overly deep pool which spills over to the screen. This is accomplished by sensing the pool height and then using this information in the computerized control system of this invention to control the height of the pool at the junction.

Example 21

Figure 29:
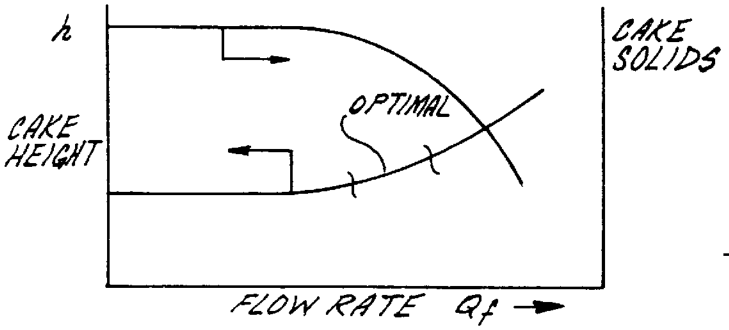

This example relates specifically to a pusher type continuous feed centrifuge. Referring to FIG. 29, by continuously sensing the cake height, cake solids may be optimized through control of volumetric flow rate. Also, by sensing the cake height and cake dryness (at discharge and along the basket in-situ), the stroke length as well as the stroke frequency can be adjusted while the machine is running or at idle to yield optimal cake dryness and capacity.

Example 22

Figure 30:
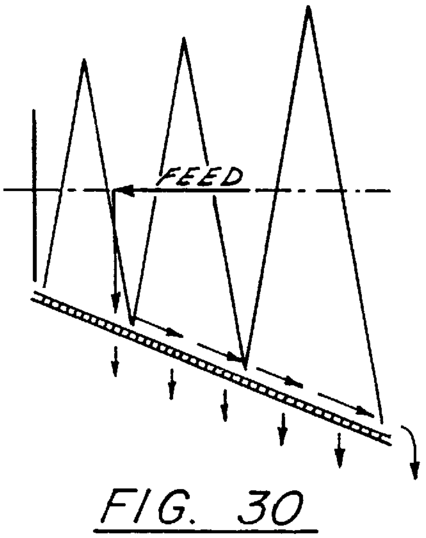

This example relates specifically to a screen scroll continuous feed centrifuge as schematically shown in FIG. 30. In accordance with this invention, information regarding the cake height and dryness along circumferential and longitudinal directions of the basket is used by the computerized control system of this invention to control differential speed between the scroll and screen as well as the feed rate while the machine is running or at idle.

Example 23

This example relates specifically to a vibratory screen centrifuge where the solids under vibration generated inertia are conveyed down the screen. Typically, the included angle of the screen is wider so that a component of the centrifugal force propels the solids down the screen toward the larger diameter overcoming the frictional resistance. This is similar to FIG. 30 but without the scroll. By sensing cake height and dryness along the basket, the amount of vibration is tuned to give optimal capacity and cake dryness.

While preferred embodiments have been shown and described, various modifications and substitutions may be made thereto without departing from the spirit and scope of the invention. Accordingly, it is to be understood that the present invention has described by way of illustrations and not limitation.

What is claimed is:

1. A continuous feed centrifuge having a bowl rotatable about its longitudinal axis and having a member movable within the rotating bowl, the member being adapted to convey higher density phase materials relative to the interior of the bowl during the rotation of the bowl, the centrifuge further comprising:

at least one sensor selected from the group consisting of ultrasonic, optical, electronic, acoustical and imaging sensors sensing at least one parameter in the centrifuge;

an electronic computerized controller associated with the centrifuge and communicating with said at least one sensor; and at least one control device controlling the operation of the centrifuge, said at least one control device communicating with said electronic controller wherein said electronic controller actuates said at least one control device, at least in part, in response to input from a respective at least one of said at least one sensor.

2. The centrifuge of claim 1 wherein said centrifuge is selected from the group consisting of solid bowl, screen bowl, scroll/screen, and pusher centrifuges.

3. The centrifuge of claim 1 wherein:

said at least one sensor comprises a sensor sensing gaps between structural elements housed within the bowl.

4. The centrifuge of claim 3 including a baffle between said movable member and said bowl and wherein said at least one sensor comprises:

a sensor sensing baffle position.

5. The centrifuge of claim 3 wherein said at least one sensor comprises:

a sensor sensing clearance between the bowl and the movable member.

6. The centrifuge of claim 3 including a weir for adjusting pool level in the bowl and wherein said at least one sensor comprises:

a sensor sensing weir overflow position.

7. The centrifuge of claim 1 wherein said at least one sensor comprises:

a sensor sensing cake height.

8. The centrifuge of claim 1 wherein said at least one sensor comprises:

a sensor sensing phase interface position.

9. The centrifuge of claim 1 wherein said at least one sensor comprises:

a sensor sensing pool height.

10. The centrifuge of claim 1 wherein said at least one sensor comprises:

a pressure sensor.

11. The centrifuge of claim 1 wherein said at least one sensor comprises:

a sensor sensing at least one of solid and liquid phase velocity.

12. The centrifuge of claim 1 wherein said at least one sensor comprises:

a sensor sensing the position of a feed inlet.

13. The centrifuge of claim 1 wherein said at least one sensor comprises:

a sensor providing images within the bowl.

14. The centrifuge of claim 13 wherein said at least one sensor further comprises:

a camera.

15. The centrifuge of claim 1 wherein said at least one sensor comprises:

a sensor sensing solids concentration profile within the bowl.

16. The centrifuge of claim 1 wherein the member comprises a conveyor and wherein said at least one control device comprises:

a device controlling blade tip clearance between the bowl and the conveyor.

17. The centrifuge of claim 1 wherein said at least one sensor comprises:

a sensor measuring particle size distribution.

18. The apparatus of claim 1 wherein said electronic computerized controller comprises:

a memory storing a set of instructions; and a processor connected to said memory executing said set of instructions in response to said input from said at least one sensor.

19. The apparatus of claim 18 wherein:

said set of instructions includes a selected operating range for a selected parameter sensed by said sensor and wherein said electronic controller controls said control device when said at least one selected parameter sensed by said sensor is outside said selected operating range.

20. The apparatus of claim 19 wherein:

said selected operating range is preprogrammed into said memory.

21. The centrifuge of claim 1 wherein said at least one control device comprises:

a device adjusting baffle position.

22. The centrifuge of claim 1 wherein said at least one control device comprises:

a device adjusting axial feed positions.

23. The centrifuge of claim 1 wherein said at least one control device comprises:

a device adjusting axial position of the movable member.

24. The centrifuge of claim 1 wherein said at least one control device is selected from the group consisting of control devices which adjust at least one of speed of rotation, flow rate of input stream, chemical addition, differential speed, absolute speed of bowl, temperature, pressure, pool height, solids/liquids concentration of input stream and conveyance speed of cake and combinations thereof.

25. An apparatus for controlling a continuous feed centrifuge having a bowl rotatable about its longitudinal axis and having a member movable within the rotating bowl, the member being adapted to convey higher density phase materials relative to the interior of the bowl during rotation comprising:

a computerized control system which monitors parameters within the bowl utilizing at least one sensor selected from the group consisting of ultrasonic, optical, electronic, acoustical and imaging sensors and executes control instructions, at least in part, in response to said monitored parameters.

26. An apparatus for controlling a centrifuge having a bowl rotatable about its longitudinal axis and having a conveyor in the rotating bowl, the conveyor being coaxially arranged for rotation within the bowl at a relative differential speed with respect to the bowl, comprising:

a computerized control system which monitors parameters within the bowl utilizing at least one sensor selected from the group consisting of ultrasonic, optical, electronic, acoustical and imaging sensors and executes control instructions, at least in part, in response to said monitored parameters.

27. A method for controlling a continuous feed centrifuge having a bowl rotatable about its longitudinal axis and having a member within the rotating bowl, the member being adapted to convey higher density phase materials relative to the interior of the bowl including:

sensing at least one parameter within the bowl of the centrifuge utilizing at least one sensor selected from the group consisting of ultrasonic, optical, electronic, acoustical and imaging sensors; and controlling the operation of the centrifuge using a computerized controller, at least in part, in response to said sensed parameter.

28. A method for controlling a centrifuge having a bowl rotatable about its longitudinal axis and a conveyor in the rotating bowl, the conveyor being coaxially arranged for rotation within the bowl at a relative differential speed with respect to the bowl, the method including:

sensing at least one parameter within the bowl of the centrifuge utilizing at least one sensor selected from the group consisting of ultrasonic, optical, electronic, acoustical and imaging sensors; and controlling the operation of the centrifuge using a computerized controller, at least in part, in response to said sensed parameter.

29. An apparatus for controlling a continuous feed centrifuge having a bowl rotatable about its longitudinal axis and having a member movable within the rotating bowl, the member being adapted to convey higher density phase materials relative to the interior of the bowl during rotation of the bowl, comprising:

at least one sensor sensing non-invasively and/or by creating a profile of a parameter within the rotating bowl of said centrifuge, each of said at least one sensor being selected from the group consisting of a sensor sensing cake height, a sensor sensing phase interface position, sensor sensing pool height, a sensor sensing at least one of solid and liquid phase velocity, a sensor sensing the position of a feed inlet, a sensor providing images within the bowl, a sensor sensing solids concentration profile within the bowl, a sensor sensing liquids concentration profile, and a sensor sensing particle size distribution;

an electronic controller associated with the operation of the centrifuge and communicating with said at least one sensor; and at least one control device for controlling the centrifuge, said at least one control device communicating with said electronic controller wherein said electronic controller actuates said at least one control device in response to input from said at least one sensor.

30. The apparatus of claim 29 wherein:

said at least one sensor are each selected from the group consisting of acoustic, electromagnetic, proximity, imaging, radio frequency, microwave and electronic detectors.

31. A method for monitoring a continuous feed centrifuge having a bowl rotatable about its longitudinal axis and having a member movable within the rotating bowl, the member being adapted to convey higher density phase materials relative to the interior of the bowl during rotation of the bowl, the method including:

sensing at least one parameter within the rotating bowl of the centrifuge utilizing at least one sensor selected from the group consisting of ultrasonic, optical, electronic, acoustical and imaging sensors;

storing said sensed parameter in a computer memory over a selected time period; and generating a data log of said sensed parameter with respect to time from said computer memory.

32. In a continuous feed centrifuge having a bowl rotatable about its longitudinal axis and having a member being adapted to convey higher density phase materials relative to the interior of the bowl during rotation of the bowl, the improvement comprising:

at least one sensing device adapted to sense a parameter in the bowl, said sensing device being selected from the group consisting of ultrasonic, optical, electronic, acoustic, electromagnetic, proximity and imaging sensors.

* * * * *